US010289117B1

(12) United States Patent
Zou et al.

(10) Patent No.: US 10,289,117 B1
(45) Date of Patent: May 14, 2019

(54) LIFT AND TILT PLATFORM

(71) Applicant: Amazon Technologies, Inc., Seattle, WA (US)

(72) Inventors: Le Zou, Cambridge, MA (US); Yuhao Qian, Andover, MA (US)

(73) Assignee: Amazon Technologies, Inc., Seattle, WA (US)

( * ) Notice: Subject to any disclaimer, the term of this patent is extended or adjusted under 35 U.S.C. 154(b) by 110 days.

(21) Appl. No.: 15/438,363

(22) Filed: Feb. 21, 2017

(51) Int. Cl.
*G06F 7/00* (2006.01)
*G05D 1/02* (2006.01)

(52) U.S. Cl.
CPC ........... *G05D 1/021* (2013.01); *G05D 1/0268* (2013.01); *G05D 2201/0216* (2013.01)

(58) Field of Classification Search
None
See application file for complete search history.

(56) References Cited

U.S. PATENT DOCUMENTS

| 8,280,547 | B2 | 10/2012 | D'Andrea et al. |
| 9,087,314 | B2 | 7/2015 | Hoffman et al. |
| 2016/0167557 | A1* | 6/2016 | Mecklinger ............. B66F 9/063 414/495 |
| 2017/0200248 | A1* | 7/2017 | Murphy ................ G06Q 50/28 |
| 2018/0215539 | A1* | 8/2018 | Kimura .................... G05D 1/02 |

FOREIGN PATENT DOCUMENTS

| JP | 2002182744 A | * | 6/2002 |
| JP | 2014089740 A | * | 5/2014 |

* cited by examiner

*Primary Examiner* — Yolanda R Cumbess
(74) *Attorney, Agent, or Firm* — Kilpatrick Townsend & Stockton LLP

(57) ABSTRACT

A docking head assembly and techniques for use are provided. The docking head assembly may include a lifting mechanism and a tilting mechanism. A tilt angle may be determined based on data that is associated with a path extending between a first floor and a second floor of a facility. The lifting mechanism may lift an inventory holder. The tilting mechanism may tilt the inventory holder in accordance with the tilt angle. The mobile drive unit may transport the inventory holder along the path in the lifted, tilted orientation.

21 Claims, 13 Drawing Sheets

LIFT AND TILT PLATFORM

BACKGROUND

Modern inventory systems, such as those in mail order warehouses, supply chain distribution centers, airport luggage systems, and custom-order manufacturing facilities, face significant challenges in responding to requests for inventory items. As inventory systems grow, the challenges of simultaneously completing a large number of packing, storing, and other inventory-related tasks become non-trivial. In inventory systems tasked with responding to large numbers of diverse inventory requests, inefficient utilization of system resources, including space, equipment, and manpower, can result in lower throughput, unacceptably long response times, an ever-increasing backlog of unfinished tasks, and, in general, poor system performance. Additionally, expanding or reducing the size or capabilities of many inventory systems requires significant changes to existing infrastructure and equipment. As a result, the cost of incremental changes to capacity or functionality may be prohibitively expensive, limiting the ability of the system to accommodate fluctuations in system throughput.

BRIEF DESCRIPTION OF THE DRAWINGS

Various examples in accordance with the present disclosure will be described with reference to the drawings, in which.

DETAILED DESCRIPTION

Figure 1:
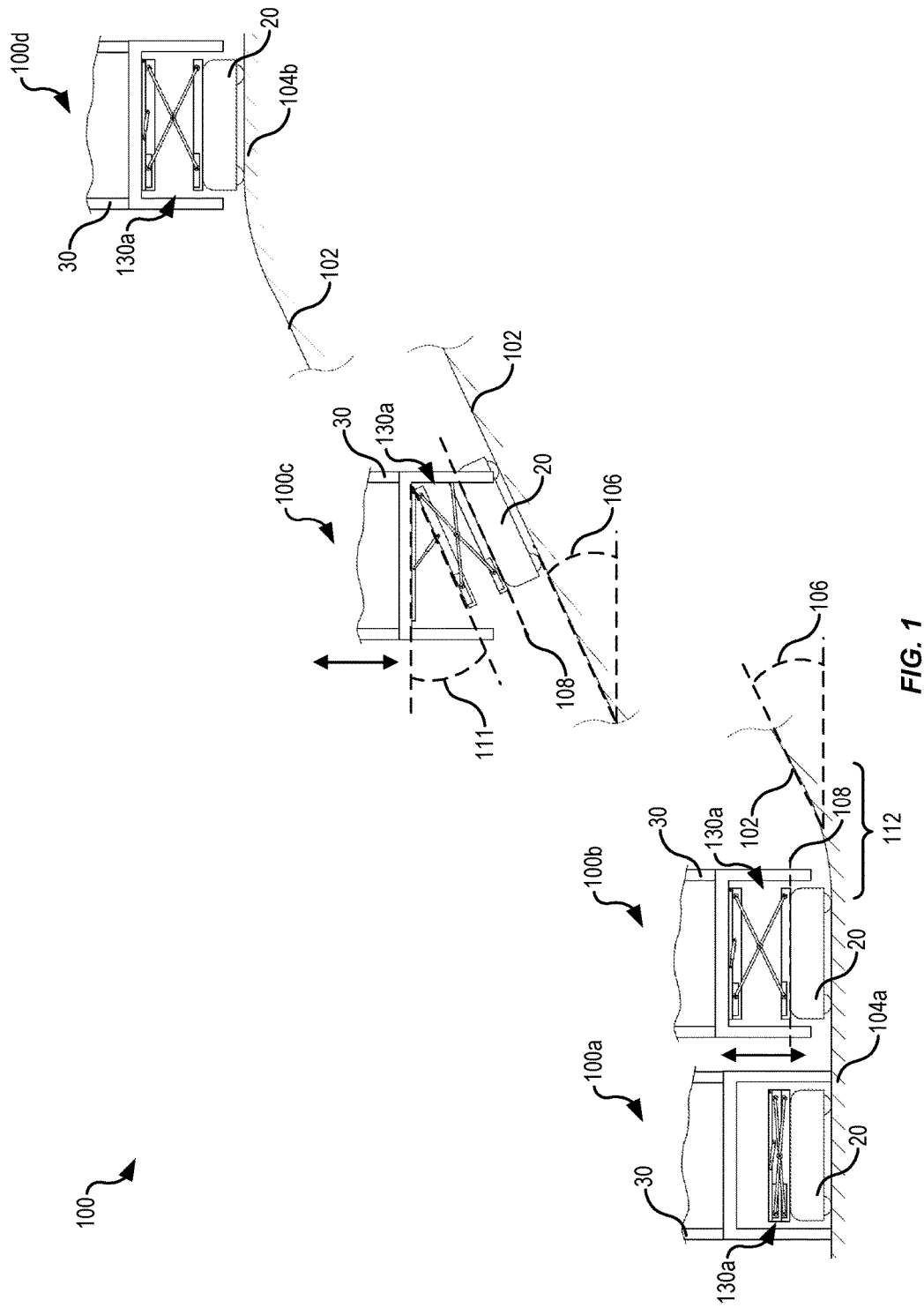
FIG. 1 illustrates example states of a mobile drive unit configured for inclined ramp traversal as the mobile drive traverses an inclined ramp, according to at least one example.

In the following description, various examples will be described. For purposes of explanation, specific configurations and details are set forth in order to provide a thorough understanding of the examples. However, it will also be apparent to one skilled in the art that the examples may be practiced without the specific details. Furthermore, well-known features may be omitted or simplified in order not to obscure the example being described.

Examples herein are directed an inventory system including robotic mobile drive units configured to transport moveable inventory holders between floors of a warehouse or other storage facility. An example mobile drive unit may include a docking head assembly that enables two degrees of freedom including lifting of an inventory holder and tilting of the inventory holder. Such tilting may be performed to improve stability of the mobile drive unit as the mobile drive unit traverses an inclined ramp between floors of the warehouse. The docking head assembly may tilt the inventory holder at a tilt angle that is equal to or about equal to an angle of the inclined ramp. The tilt angle can be precomputed, determined dynamically, and/or adjusted dynamically based on real-time data (e.g., sensor data gathered by sensors of the mobile drive unit).

A mobile drive unit adapted in this manner (e.g., including a tilting and lifting docking head assembly), which may be referred to as a ramp mobile drive unit, may operate in an inventory system that includes other types of mobile drive units. For example, a different type of mobile drive unit, which may be referred to as a floor mobile drive unit, may include a docking head assembly that enables vertical lifting of inventory holders, but does not also include tilting capabilities. In this manner, the two types of mobile drive units may operate in the same inventory system using the same inventory holders. In most cases, the two types of mobile drive units may be distinguishable based only on the capabilities of their respective docking head assemblies. In some examples, however, the two types may be distinguishable in other ways such as use of traction tires, increased output motors, additional and/or different sensors, and other improvements to adapt the ramp mobile drive units for ramp traversal. A management system (e.g., a computer system manages the operation of mobile drive units in the inventory system) may assign inventory movement tasks based on mobile drive unit type. For example, an inter-floor task may be assigned to a ramp mobile drive unit, while an intra-floor task may be assigned to a floor mobile drive unit. In some examples, all mobile drive units in a multi-floor facility include lifting and tilting capabilities.

Turning now to a particular example, in this example, a ramp mobile drive unit operating in an inventory system may be instructed to transport an inventory holder along an inclined ramp (e.g., between floors of a warehouse). The ramp mobile drive unit may include a docking head assembly coupled to a frame of the mobile drive unit. The docking head assembly may include a docking platform, a tilting mechanism, and a lifting mechanism. The lifting mechanism may include a set of scissor links or any other suitable lifting structure coupled to a first actuator to enable vertical movement of the docking platform (e.g., raising and lowering of the docking platform). To couple to the inventory holder, the mobile drive unit may move to a location beneath the inventory holder and the first actuator of the lifting mechanism may be activated to raise the docking platform into engagement with an underside of the inventory holder. This action may lift the inventory holder off of the ground and into a first, non-tilted orientation. The tilting mechanism, which may be disposed between the docking platform and the lifting mechanism, may include a second actuator coupled to an underside of the docking platform to enable tilting of the docking platform with respect to a horizontal axis of the mobile drive unit. A tilt angle for tilting the docking platform may be accessed or computed. The tilt angle may correspond directly to an angle of the inclined ramp. As the ramp mobile drive unit begins to traverse the inclined ramp, the second actuator of the tilting mechanism may be activated to tilt the docking platform through the tilt angle and into a second, tilted orientation. The docking head assembly may hold the docking platform and therefore the inventory holder in this second, tilted orientation while the ramp mobile drive unit traverses the inclined ramp. As the ramp mobile drive unit exits the inclined ramp, the docking platform may be tilted back to the first, non-tilted orientation and the inventory holder may be transported to a drop location. At the drop location, the docking platform may be lowered to disengage from the inventory holder.

Turning now to the figures, FIG. 1 illustrates example states 100a-100d of a mobile drive unit 20 configured for inclined ramp traversal as the mobile drive unit 20 traverses an inclined ramp 102. The mobile drive unit 20 illustrated in FIG. 1 is an example of a ramp mobile drive unit. The inclined ramp 102 may extend between a first floor 104a and a second floor 104b. The floors 104 may be disposed within an inventory storage facility, warehouse, or other inventory processing facility in which the inventory systems described herein may be implemented. The floors 104 may have any suitable elevation difference. The inclined ramp 102 may be defined as any inclined plane, with a ramp angle 106 measured between a horizontal plane of the first floor 104a and the inclined plane. The ramp angle 106 may be expressed in slope, grade, or other suitable measure. In some examples, the inclined ramp 102 has a continuous profile (e.g., fixed slope), a varied profile (e.g., section having various slopes), and any other profile. In some examples, the inclined ramp 102 has a helical shape.

The mobile drive unit 20 may include a docking head assembly 130a. The docking head assembly 130a as described in detail herein may enable vertical lifting of an inventory holder 30 and tilting of the inventory holder 30. In some examples, the mobile drive unit 20 may be configured at the example states 100a-100d by a management device. The function of the management device, which may be distributed between the mobile drive unit 20 (e.g., firmware running on the mobile drive unit) and a remote server, may manage the operation of the mobile drive unit 20 and other mobile drive units 20. In this manner, the configuration of the mobile drive unit 20 at the states 100a-100d may be achieved as the mobile drive unit 20 communicates with the management device (e.g., receives instructions, processes instructions, gathers sensor data, and other suitable functions). The management device may have access to information about the ramp angle 106.

At the states 100a and 100b, the mobile drive unit 20 is disposed entirely on the first floor 104a. At the state 100a, the docking head assembly 130a is shown in a fully retracted position so as to enable the mobile drive unit 20 to move to a location directly below the inventory holder 30. With the docking head assembly 130a in the retracted position and the mobile drive unit 20 located below the inventory holder 30, the mobile drive unit 20 is prepared to detachably couple with the inventory holder 30. As illustrated in the state 100b, such detachable coupling may include the docking head assembly 130a translating vertically with respect to a horizontal axis 108 of the mobile drive unit 20 and into engagement with an underside of the inventory holder 30. In some examples, the docking head assembly 130a may translate between 5-10 centimeters to couple with the inventory holder 30. In some examples, when the mobile drive unit 20 has a lower profile and the docking head assembly 130a has a wider range of actuation, the docking head assembly 130a may translate more than 10 centimeters to couple with the inventory holder 30. In any event, the docking head assembly 130a may be translated vertically at least until legs of the inventory holder 30 are raised off of the surface of the first floor 104a, which results in the inventory holder 30 being moved into a first orientation with respect to the mobile drive unit 20.

With the inventory holder 30 in the first orientation illustrated at the state 100b, the mobile drive unit 20 may begin traversing the inclined ramp 102. This may include the mobile drive unit 20 moving toward the inclined ramp 102 (e.g., to the right in FIG. 1). As the mobile drive unit 20 begins to traverse the inclined ramp 102 (e.g., through a transition zone 112 between the first floor 104a and the inclined ramp 102 where the angle changes) and/or before the mobile drive unit 20 reaches the transition zone 112 of the inclined ramp 102, the docking head assembly 130a and therefore the inventory holder 30 may be tilted through a tilt angle 111 with respect to the horizontal axis 108. The tilt angle 111 may be any suitable angle. In some examples, the tilt angle 111 ranges between 1 degree and 30 degrees. Depending on the implementation, the tilt angle 111 may be greater than 30 degrees. The docking head assembly 130a may be tilted with an angular velocity that is correlated to a velocity at which the mobile drive unit 20 moves. In some examples, the docking head assembly 130a may be tilted in a manner that approximates the angular change of the transition zone 112 as the mobile drive unit 20 traverses the transition zone 112. In some examples, the velocity of the mobile drive unit 20 is reduced in the transition zone 112 to ensure that the docking head assembly 130a has adequate time to tilt the inventory holder 30. In some examples, the tilting of the docking head assembly 130a may be performed while the mobile drive unit 20 is stationary (e.g., before the mobile drive unit 20 begins its traversal of the inclined ramp 102).

At the state 100c, the mobile drive unit 20 is entirely located on the inclined ramp 102, with the inventory holder 30 having been moved into a second orientation. Between the state 100b and the state 100c, the inventory holder 30 has been tilted with respect to the horizontal axis 108 such that the tilt angle 111 corresponds to the ramp angle 106. This tilting may increase stability of the system including the inventory holder 30 and the mobile drive unit 20 by aligning a load and/or a center of gravity of the inventory holder 30 with the mobile drive unit 20. In some examples, such tilting may also reduce the likelihood that items will fall out of the inventory holder 30 as the orientation of the inventory holder 30 with respect to the horizontal planes of the floors 104 is maintained during the ramp traversal.

The tilt angle 111 may be determined in any suitable manner as described herein. For example, sensor data from a gyro sensor and/or acceleration sensor on the mobile drive unit 20 may be used to measure an angle that the mobile drive unit 20 is currently experiencing. In this manner, the tilt angle 111 may be dynamically determined and/or adjusted based on actual sensed conditions. As an additional example, the tilt angle 111 may be computed based on map data from a global warehouse map. The global warehouse map may be a digital map that defines boundaries in which the mobile drive units 20 can navigate. The global warehouse map may be used to compute drive paths for the mobile drive unit 20. Properties of the inclined ramp 102 may be stored (e.g., in a database or in memory) in connection with the global warehouse map. Such properties may include sets of coordinates that define the extents of the ramps (e.g., beginning, length, width, and end), surface properties, and a value for the ramp angle 106.

In some examples, between the state 100b and the state 100c, the inventory holder 30 has also been lowered with respect to the horizontal axis 108. This lowering may include the docking head assembly 130a moving vertically down. This movement may improve stability of the system as the load and/or center of gravity of the inventory holder 30 has been moved nearer to the mobile drive unit 20. The inclined ramp 102 may be designed to accommodate such lowering. For example, as discussed with reference to FIG. 10, a width of the inclined ramp 102 may be narrower than the legs of the inventory holder 30 such that the legs of the inventory holder 30 extend below the edges of the inclined ramp 102. In some examples, the mobile drive unit 20 itself may be constructed to have a low profile and the docking head assembly 130a may be constructed to have a wide range of actuation. Given the low profile of the mobile drive unit 20 and the wide range of actuation of the docking head assembly 130a, the system may enable movement of the center of gravity of the inventory holder 30 to a position very close to the inclined ramp 102 (e.g., the inventory holder 30 may be lowered substantially while on the inclined ramp 102).

At the state 100d, the mobile drive unit 20 is entirely located on the second floor 104b, with the inventory holder 30 having been moved back into the first orientation back through the tilt angle 111. Just as the docking head assembly 130a was tilted as the mobile drive unit 20 began traversing the inclined ramp 102, the docking head assembly 130a can be restored to a non-tilted orientation as the mobile drive unit 20 completes its traversal of the inclined ramp 102.

Figure 2:
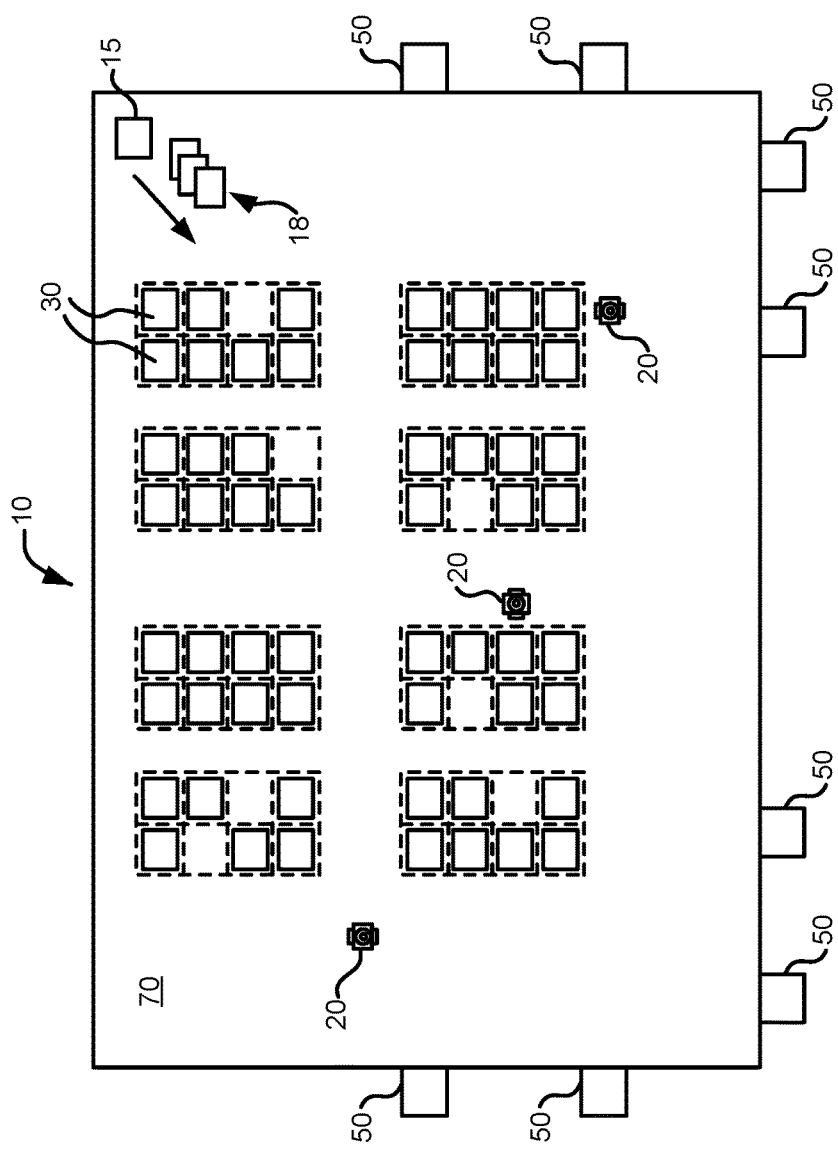
FIG. 2 illustrates components of an inventory system, according to at least one example.

FIG. 2 illustrates the components of an inventory system 10. The inventory system 10 may include a management module 15, one or more mobile drive units 20, one or more inventory holders 30, and one or more inventory stations 50. The mobile drive units 20 transport the inventory holders 30 between points within a workspace 70 and between other workspaces located above and/or below the workspace 70 in response to commands communicated by the management module 15. Each of the inventory holders 30 may be configured with one or more compartments for containing one or more inventory items. In some examples, the inventory holders 30 may be inventory holders configured to hold one or more containers which may hold inventory items. Thus, the inventory system 10 may be capable of moving inventory items between locations within the workspace 70 to facilitate the entry, processing, and/or removal of inventory items from the inventory system 10 and the completion of other tasks involving inventory items.

The management module 15 may assign tasks to appropriate components of the inventory system 10 and coordinate operation of the various components in completing the tasks. These tasks may relate not only to the movement and processing of inventory items, but also to the management and maintenance of the components of the inventory system 10. For example, the management module 15 may assign portions of the workspace 70 as parking spaces for the mobile drive units 20, the scheduled recharge or replacement of mobile drive unit batteries, the storage of the inventory holders 30, or any other operations associated with the functionality supported by the inventory system 10 and its various components. The management module 15 may select components of the inventory system 10 to perform these tasks and communicate appropriate commands and/or data to the selected components to facilitate completion of these operations. Although shown in FIG. 2 as a single, discrete component, the management module 15 may represent multiple components and may represent or include portions of the mobile drive units 20 or other components of the inventory system 10. As a result, any or all of the interaction between a particular mobile drive unit 20 and the management module 15 that is described below may, in some examples, represent peer-to-peer communication between that mobile drive unit 20 and one or more other mobile drive units 20. The components and operation of an example of the management module 15 are discussed further below with respect to FIG. 3. In some examples, the management module 15 may be distributed between a server and the mobile drive units 20. In this example, the server may provide instructions to the mobile drive units 20 which may process the instructions and generate other instructions to manage components of the mobile drive units 20. In some examples, the management module 15 may include any suitable combination of analog and digital components configured to implement the techniques described herein. For example, the management module 15 may include an analog controller configured to control certain aspects of the operation of the mobile drive unit (e.g., adjusting a mounting angle of the inventory holder 30 relative to the mobile drive unit 20 to account for the distribution of mass of the inventory holder 30, to account for the location of a center of gravity of the inventory holder 30, to account for movement of inventory items in the inventory holder 30, to account for movement of the inventory holder 30 when coupled to the mobile drive unit 20, or to account for any other condition affecting stability of the inventory holder 30).

The mobile drive units 20 may move the inventory holders 30 between locations within the workspace 70. The mobile drive units 20 may represent any devices or components appropriate for use in the inventory system 10 based on the characteristics and configuration of the inventory holders 30 and/or other elements of the inventory system 10. In a particular example of the inventory system 10, the mobile drive units 20 represent independent, self-powered devices configured to freely move about the workspace 70. Examples of such inventory systems are disclosed in U.S. Pat. No. 9,087,314, issued on Jul. 21, 2015, titled "SYSTEM AND METHOD FOR POSITIONING A MOBILE DRIVE UNIT" and U.S. Pat. No. 8,280,547, issued on Oct. 2, 2012, titled "METHOD AND SYSTEM FOR TRANSPORTING INVENTORY ITEMS", the entire disclosures of which are herein incorporated by reference. In alternative examples, the mobile drive units 20 represent elements of a tracked inventory system configured to move the inventory holders 30 along tracks, rails, cables, crane system, or other guidance or support elements traversing the workspace 70. In such an example, the mobile drive units 20 may receive power and/or support through a connection to the guidance elements, such as a powered rail. Additionally, in some examples of the inventory system 10, the mobile drive units 20 may be configured to utilize alternative conveyance equipment to move within the workspace 70 and/or between separate portions of the workspace 70. The components and operation of an example of a mobile drive unit 20 are discussed further below with respect to FIGS. 4 and 5.

Additionally, the mobile drive units 20 may be capable of communicating with the management module 15 to receive information identifying selected inventory holders 30, transmit the locations of the mobile drive units 20, or exchange any other suitable information to be used by the management module 15 or the mobile drive units 20 during operation. The mobile drive units 20 may communicate with the management module 15 wirelessly, using wired connections between the mobile drive units 20 and the management module 15, and/or in any other appropriate manner. As one example, some examples of the mobile drive unit 20 may communicate with the management module 15 and/or with one another using 802.11, Bluetooth, or Infrared Data Association (IrDA) standards, or any other appropriate wireless communication protocol. As another example, in a tracked inventory system 10, tracks or other guidance elements upon which the mobile drive units 20 move may be wired to facilitate communication between the mobile drive units 20 and other components of the inventory system 10. Furthermore, as noted above, the management module 15 may include components of individual mobile drive units 20. Thus, for the purposes of this description and the claims that follow, communication between the management module 15 and a particular mobile drive unit 20 may represent communication between components of a particular mobile drive unit 20. In general, the mobile drive units 20 may be powered, propelled, and controlled in any manner appropriate based on the configuration and characteristics of the inventory system 10.

In some examples, the inventory holders 30 may store inventory items within containers. In a particular example, the inventory holders 30 may include multiple storage shelves with each storage shelf capable of holding one or more containers. Within each container may be held one or more types of inventory items. The inventory holders 30 are capable of being carried, rolled, and/or otherwise moved by the mobile drive units 20. In some examples, the inventory holder 30 may provide additional propulsion to supplement that provided by the mobile drive unit 20 when moving the inventory holder 30. In some examples, the inventory holders 30 may store inventory items within one or more storage bins.

Additionally, in some examples, inventory items 40 may also hang from hooks or bars (not shown) within or on the inventory holder 30. In general, the inventory holder 30 may store the inventory items 40 in any appropriate manner within the inventory holder 30 and/or on the external surface of the inventory holder 30.

Additionally, each inventory holder 30 may include a plurality of faces. In some examples, each container may be accessible through one or more faces of the inventory holder 30. For example, in a particular example, the inventory holder 30 includes four faces. In such an example, containers located at a corner of two faces may be accessible through either of those two faces, while each of the other containers is accessible through an opening in one of the four faces. The mobile drive unit 20 may be configured to rotate the inventory holder 30 at appropriate times to present a particular face and the containers accessible from that face to an operator or other components of the inventory system 10.

Inventory items represent any objects suitable for storage, retrieval, and/or processing in an automated inventory system 10. For the purposes of this description, "inventory items" may represent any one or more objects of a particular type that are stored in the inventory system 10. Thus, a particular inventory holder 30 is currently "storing" a particular inventory item if the inventory holder 30 currently holds one or more units of that type. As one example, the inventory system 10 may represent a mail order warehouse facility, and inventory items may represent merchandise stored in the warehouse facility. During operation, the mobile drive units 20 may retrieve the inventory holders 30 containing one or more inventory items requested in an order to be packed for delivery to a customer or the inventory holders 30 carrying pallets containing aggregated collections of inventory items for shipment. Moreover, in some examples of the inventory system 10, boxes containing completed orders may themselves represent inventory items.

In some examples, the inventory system 10 may also include one or more inventory stations 50. The inventory stations 50 represent locations designated for the completion of particular tasks involving inventory items. Such tasks may include the removal of inventory items and/or containers from the inventory holders 30, the introduction of inventory items and/or containers into the inventory holders 30, the counting of inventory items and/or containers in the inventory holders 30, the decomposition of inventory items (e.g. from pallet- or case-sized groups to individual inventory items) into containers in the inventory holders 30, the consolidation of inventory items and/or containers between the inventory holders 30, transfer of inventory items and/or containers between the inventory holders 30, and/or the processing or handling of inventory items in any other suitable manner. In some examples, the inventory stations 50 may just represent the physical locations where a particular task involving inventory items can be completed within the workspace 70. In alternative examples, the inventory stations 50 may represent both the physical location and also any appropriate equipment for processing or handling inventory items, such as scanners for monitoring the flow of inventory items in and out of the inventory system 10, communication interfaces for communicating with the management module 15, and/or any other suitable components. The inventory stations 50 may be controlled, entirely or in part, by human operators or may be fully automated. Moreover, the human or automated operators of the inventory stations 50 may be capable of performing certain tasks on inventory items, such as packing, counting, or transferring inventory items, as part of the operation of the inventory system 10.

The workspace 70 represents an area associated with the inventory system 10 in which the mobile drive units 20 can move and/or the inventory holders 30 can be stored. For example, the workspace 70 may represent all or part of the floor of a mail-order warehouse in which the inventory system 10 operates. Although FIG. 2 shows, for the purposes of illustration, an example of the inventory system 10 in which the workspace 70 includes a fixed, predetermined, and finite physical space, some examples of the inventory system 10 may include the mobile drive units 20 and the inventory holders 30 that are configured to operate within a workspace 70 that is of variable dimensions and/or an arbitrary geometry. While FIG. 2 illustrates a particular example of the inventory system 10 in which the workspace 70 is entirely enclosed in a building, alternative examples may utilize workspaces 70 in which some or all of the workspace 70 is located outdoors, within a vehicle (such as a cargo ship), located across more than one floor, or otherwise unconstrained by any fixed structure.

In operation, the management module 15 selects appropriate components to complete particular tasks and transmits task assignments 18 to the selected components to trigger completion of the relevant tasks. Each task assignment 18 defines one or more tasks to be completed by a particular component. These tasks may relate to the retrieval, storage, replenishment, and counting of inventory items and/or the management of the mobile drive units 20, the inventory holders 30, the inventory stations 50 and other components of the inventory system 10. Depending on the component and the task to be completed, a particular task assignment 18 may identify locations, components, and/or actions associated with the corresponding task and/or any other appropriate information to be used by the relevant component in completing the assigned task.

In some examples, the management module 15 generates the task assignments 18 based, in part, on inventory requests that the management module 15 receives from other components of the inventory system 10 and/or from external components in communication with the management module 15. These inventory requests identify particular operations to be completed involving inventory items stored or to be stored within the inventory system 10 and may represent communication of any suitable form. For example, in some examples, an inventory request may represent a shipping order specifying particular inventory items that have been purchased by a customer and that are to be retrieved from the inventory system 10 for shipment to the customer. The management module 15 may also generate the task assignments 18 independently of such inventory requests, as part of the overall management and maintenance of the inventory system 10. For example, the management module 15 may generate the task assignments 18 in response to the occurrence of a particular event (e.g., in response to a mobile drive unit 20 requesting a space to park), according to a predetermined schedule (e.g., as part of a daily start-up routine), or at any appropriate time based on the configuration and characteristics of the inventory system 10. After generating one or more task assignments 18, management module 15 transmits the generated task assignments 18 to appropriate components for completion of the corresponding task. The relevant components then execute their assigned tasks.

With respect to the mobile drive units 20 specifically, the management module 15 may, in some examples, communicate the task assignments 18 to selected mobile drive units 20 that identify one or more destinations for the selected mobile drive units 20. The management module 15 may select a mobile drive unit 20 to assign the relevant task based on the location or state of the selected mobile drive unit 20, an indication that the selected mobile drive unit 20 has completed a previously-assigned task, a predetermined schedule, and/or any other suitable consideration. These destinations may be associated with an inventory request the management module 15 is executing or a management objective the management module 15 is attempting to fulfill. For example, the task assignment may define the location of an inventory holder 30 to be retrieved, an inventory station 50 to be visited, a storage location where the mobile drive unit 20 should park until receiving another task, or a location associated with any other task appropriately based on the configuration, characteristics, and/or state of the inventory system 10, as a whole, or individual components of the inventory system 10. For example, in some examples, such decisions may be based on the popularity of particular inventory items, the staffing of a particular inventory station 50, the tasks currently assigned to a particular mobile drive unit 20, and/or any other appropriate considerations.

As part of completing these tasks, the mobile drive units 20 may dock with and transport the inventory holders 30 within the workspace 70. In some examples, docking with an inventory holder 30 may include coupling components of the mobile drive unit 20 to components of the inventory holder 30. The mobile drive units 20 may dock with the inventory holders 30 by connecting to, lifting, and/or otherwise interacting with the inventory holders 30 in any other suitable manner so that, when docked, the mobile drive units 20 are coupled to and/or support the inventory holders 30 and can move the inventory holders 30 within the workspace 70. While the description below focuses on some examples of the mobile drive unit 20 and the inventory holder 30 that are configured to dock in a particular manner, alternative examples of the mobile drive unit 20 and the inventory holder 30 may be configured to dock in any manner suitable to allow the mobile drive unit 20 to move the inventory holder 30 within the workspace 70. Additionally, as noted below, in some examples, the mobile drive units 20 represent all or portions of the inventory holders 30. In such examples, the mobile drive units 20 may not dock with the inventory holders 30 before transporting the inventory holders 30 and/or the mobile drive units 20 may each remain continually docked with a particular inventory holder 30.

While the appropriate components of the inventory system 10 complete assigned tasks, the management module 15 may interact with the relevant components to ensure the efficient use of space, equipment, manpower, and other resources available to the inventory system 10. As one specific example of such interaction, the management module 15 is responsible, in some examples, for planning the paths the mobile drive units 20 take when moving within the workspace 70 and for allocating use of a particular portion of the workspace 70 to a particular mobile drive unit 20 for purposes of completing an assigned task. In such examples, the mobile drive units 20 may, in response to being assigned a task, request a path to a particular destination associated with the task. Moreover, while the description below focuses on one or more examples in which the mobile drive unit 20 requests paths from the management module 15, the mobile drive unit 20 may, in alternative examples, generate its own paths.

Components of the inventory system 10 may provide information to the management module 15 regarding their current state, other components of the inventory system 10 with which they are interacting, and/or other conditions relevant to the operation of the inventory system 10. This may allow the management module 15 to utilize feedback from the relevant components to update algorithm parameters, adjust policies, or otherwise modify its decision-making to respond to changes in operating conditions or the occurrence of particular events.

In addition, while the management module 15 may be configured to manage various aspects of the operation of the components of the inventory system 10, in some examples, the components themselves may also be responsible for decision-making relating to certain aspects of their operation, thereby reducing the processing load on the management module 15.

Thus, based on its knowledge of the location, current state, and/or other characteristics of the various components of the inventory system 10 and an awareness of all the tasks currently being completed, the management module 15 can generate tasks, allot usage of system resources, and otherwise direct the completion of tasks by the individual components in a manner that optimizes operation from a system-wide perspective. Moreover, by relying on a combination of both centralized, system-wide management and localized, component-specific decision-making, some examples of the inventory system 10 may be able to support a number of techniques for efficiently executing various aspects of the operation of the inventory system 10. As a result, some examples of the management module 15 may, by implementing one or more management techniques described below, enhance the efficiency of the inventory system 10 and/or provide other operational benefits.

Figure 3:
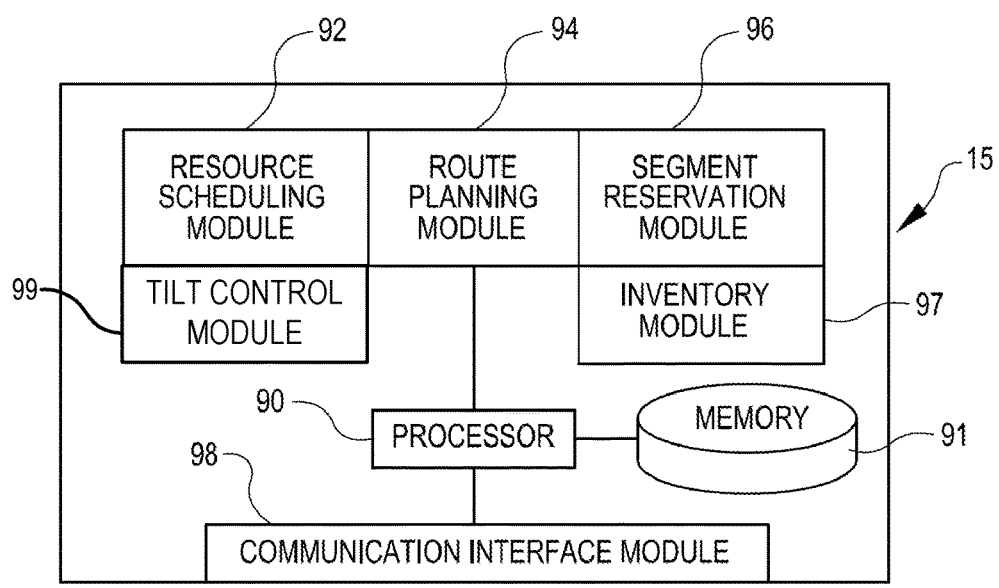
FIG. 3 illustrates in greater detail the components of an example management module that may be utilized in some examples of the inventory system shown in FIG. 2.

FIG. 3 illustrates in greater detail the components of a particular example of the management module 15. As shown, the example includes a resource scheduling module 92, a route planning module 94, a segment reservation module 96, an inventory module 97, a communication interface module 98, a tilt control module 99, a processor 90, and a memory 91. The management module 15 may represent a single component, multiple components located at a central location within the inventory system 10, or multiple components distributed throughout inventory system 10. For example, the management module 15 may represent components of one or more mobile drive units 20 that are capable of communicating information between the mobile drive units 20 and coordinating the movement of the mobile drive units 20 within the workspace 70. In general, the management module 15 may include any appropriate combination of hardware and/or software suitable to provide the described functionality.

The processor 90 is operable to execute instructions associated with the functionality provided by the management module 15. The processor 90 may comprise one or more general purpose computers, dedicated microprocessors, or other processing devices capable of communicating electronic information. Examples of the processor 90 include one or more application-specific integrated circuits ("ASICs"), field programmable gate arrays ("FPGAs"), digital signal processors ("DSPs") and any other suitable specific or general purpose processors.

The memory 91 stores processor instructions, inventory requests, reservation information, state information for the various components of the inventory system 10 and/or any other appropriate values, parameters, or information utilized by the management module 15 during operation. For example, the memory 91 may store an overall warehouse map that includes a representation of the inventory system in which the management module 15 operates. The memory 91 may represent any collection and arrangement of volatile or nonvolatile, local or remote devices suitable for storing data. Examples of the memory 91 include, but are not limited to, random access memory ("RAM") devices, read only memory ("ROM") devices, magnetic storage devices, optical storage devices or any other suitable data storage devices.

The resource scheduling module 92 processes received inventory requests and generates one or more assigned tasks to be completed by the components of the inventory system 10. The resource scheduling module 92 may also select one or more appropriate components for completing the assigned tasks and, using the communication interface module 98, communicate the assigned tasks to the relevant components.

Additionally, the resource scheduling module 92 may also be responsible for generating assigned tasks associated with various management operations, such as prompting the mobile drive units 20 to recharge batteries or have batteries replaced, instructing the inactive mobile drive units 20 to park in a location outside the anticipated traffic flow or a location near the anticipated site of future tasks, and/or directing the mobile drive units 20 selected for repair or maintenance to move towards a designated maintenance station.

The route planning module 94 receives route requests from the mobile drive units 20. These route requests identify one or more destinations associated with a task the requesting mobile drive unit 20 is executing. In response to receiving a route request, the route planning module 94 generates a path to one or more destinations identified in the route request. The route planning module 94 may implement any appropriate algorithms utilizing any appropriate parameters, factors, and/or considerations to determine the appropriate path. After generating an appropriate path, the route planning module 94 transmits a route response identifying the generated path to the requesting mobile drive unit 20 using the communication interface module 98.

The segment reservation module 96 receives reservation requests from the mobile drive units 20 attempting to move along paths generated by the route planning module 94. These reservation requests request the use of a particular portion of the workspace 70 (referred to herein as a "segment") to allow the requesting mobile drive unit 20 to avoid collisions with other mobile drive units 20 while moving across the reserved segment. In response to received reservation requests, the segment reservation module 96 transmits a reservation response granting or denying the reservation request to the requesting mobile drive unit 20 using the communication interface module 98.

The inventory module 97 maintains information about the location and number of the inventory items 40 in the inventory system 10. Information can be maintained about the number of the inventory items 40 in a particular inventory holder 30, and the maintained information can include the location of those inventory items 40 in the inventory holder 30. The inventory module 97 can also communicate with the mobile drive units 20, utilizing the task assignments 18 to maintain, replenish or move the inventory items 40 within the inventory system 10.

The communication interface module 98 facilitates communication between the management module 15 and other components of the inventory system 10, including reservation responses, reservation requests, route requests, route responses, and task assignments. These reservation responses, reservation requests, route requests, route responses, and task assignments may represent communication of any form appropriate based on the capabilities of the management module 15 and may include any suitable information. Depending on the configuration of the management module 15, the communication interface module 98 may be responsible for facilitating either or both of wired and wireless communication between the management module 15 and the various components of the inventory system 10. In some examples, the management module 15 may communicate using communication protocols such as 802.11, Bluetooth, or Infrared Data Association (IrDA) standards. Furthermore, the management module 15 may, in some examples, represent a portion of the mobile drive unit 20 or other components of the inventory system 10. In such examples, the communication interface module 98 may facilitate communication between the management module 15 and other parts of the same system component.

The tilt control module 99 is configured to manage the operation described herein relating to lifting and tilting of the docking head assembly 130a. For example, the tilt control module 99 accesses or otherwise receives information regarding a ramp angle in order to determine a tilt angle for the docking head assembly 130a. Similarly, the tilt control module 99 accesses or otherwise receives sensor data from one or more sensors on the mobile drive unit 20 configured to sense data relating to stability of the mobile drive unit 20. For example, the sensor data may include position data, gyro data, acceleration data, load data, force data, movement data, or any other suitable data that may be collected, sensed, derived, or accessed and that relates to the stability of the mobile drive unit 20. The tilt control module 99 is also configured to instruct components of the mobile drive unit 20 to engage with the inventory holder 30 and adjust a tilt angle of the mobile drive unit 20 and the inventory holder 30. In this manner, the tilt control module 99 may manage the determination of the tilt angle and the tilting of the inventory holder 30 through the tilt angle.

In general, the resource scheduling module 92, the route planning module 94, the segment reservation module 96, the inventory module 97, the communication interface module 98, and the tilt control module 99, may each represent any appropriate hardware and/or software suitable to provide the described functionality. In addition, as noted above, the management module 15 may, in some examples, represent multiple different discrete components and any or all of the resource scheduling module 92, the route planning module 94, the segment reservation module 96, the inventory module 97, the communication interface module 98, and the tilt control module 99, may represent components physically separate from the remaining elements of the management module 15. Moreover, any two or more of the resource scheduling module 92, the route planning module 94, the segment reservation module 96, the inventory module 97, the communication interface module 98, and the tilt control module 99, may share common components. For example, in some examples, the resource scheduling module 92, the route planning module 94, the segment reservation module 96, the inventory module 97, and the tilt control module 99 represent computer processes executing on the processor 90 and the communication interface module 98 comprises a wireless transmitter, a wireless receiver, and a related computer process executing on the processor 90.

Figure 4:
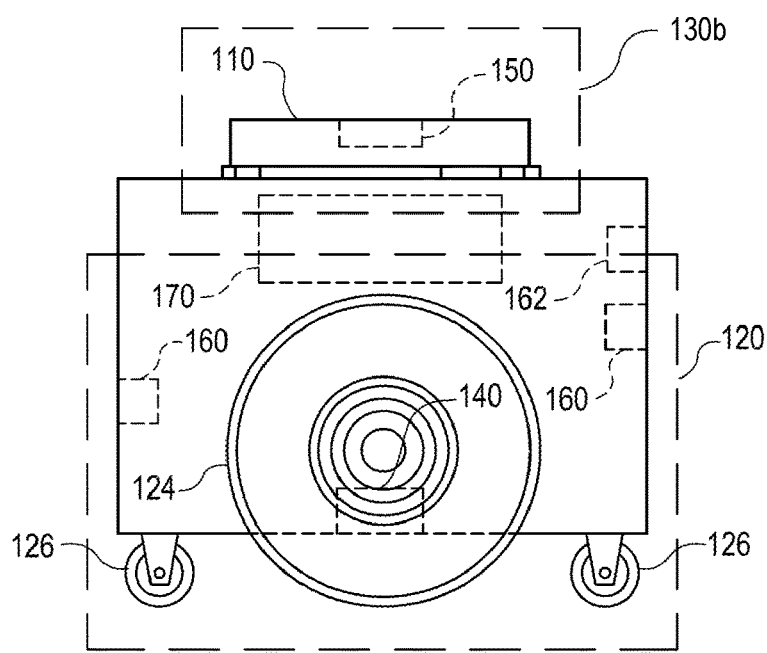
FIGS. 4 and 5 illustrate in greater detail an example mobile drive unit that may be utilized in some examples of the inventory system shown in FIG. 2.
Figure 5:
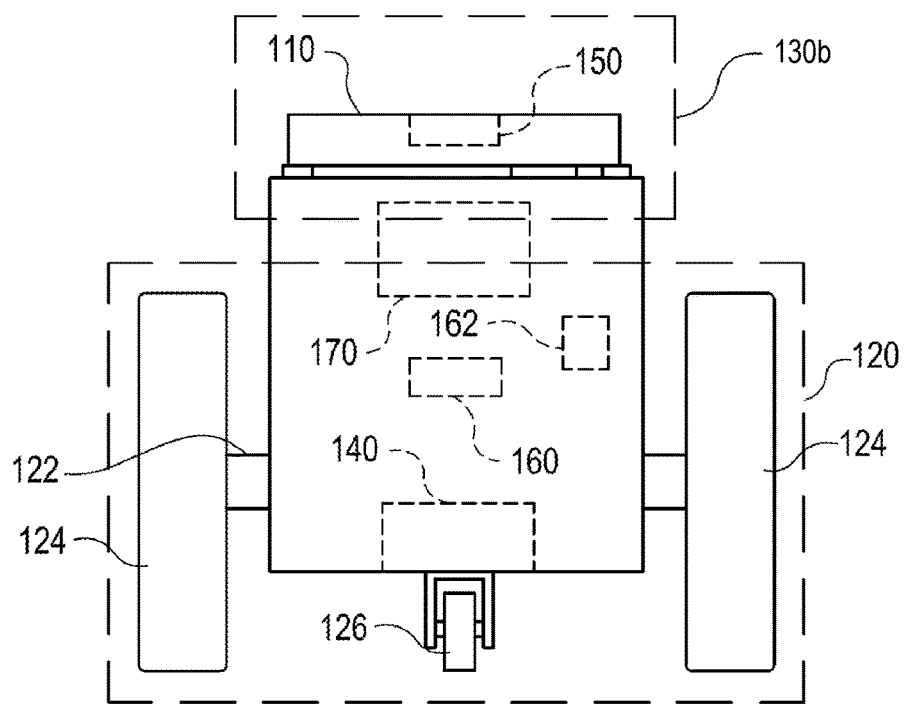

FIGS. 4 and 5 illustrate in greater detail the components of a particular example of the mobile drive unit 20. In particular, FIGS. 4 and 5 include a side and front view of an example mobile drive unit 20. The mobile drive unit 20 includes a platform 110, a drive module 120, a docking head assembly 130b, and a control module 170. The platform 110 may be considered a docking head or docking platform. The docking head assembly 130b may be an actuator configured to move the platform 110 to engage with the inventory holder 30. Additionally, the mobile drive unit 20 may include one or more sensors configured to detect or determine the location of the mobile drive unit 20, the inventory holder 30, and/or other appropriate elements of the inventory system 10. In the illustrated example, the mobile drive unit 20 includes a position sensor 140, a holder sensor 150, an obstacle sensor 160, and an identification signal transmitter 162.

The platform 110, in some examples of the mobile drive unit 20, couples the mobile drive unit 20 to the inventory holder 30 and/or supports the inventory holder 30 when the mobile drive unit 20 is docked to the inventory holder 30. The platform 110 may additionally allow the mobile drive unit 20 to maneuver the inventory holder 30, such as by lifting the inventory holder 30, propelling the inventory holder 30, rotating the inventory holder 30, tilting the inventory holder 30, and/or moving the inventory holder 30 in any other appropriate manner. The platform 110 may also include any appropriate combination of components, such as ribs, spikes, and/or corrugations, to facilitate such manipulation of the inventory holder 30. For example, in some examples, the platform 110 may include a high-friction portion that abuts a portion of the inventory holder 30 while the mobile drive unit 20 is docked to the inventory holder 30. In such examples, frictional forces created between the high-friction portion of the platform 110 and a surface of the inventory holder 30 may induce translational and rotational movement in the inventory holder 30 when the platform 110 moves and rotates, respectively. As a result, the mobile drive unit 20 may be able to manipulate the inventory holder 30 by moving or rotating the platform 110, either independently or as a part of the movement of the mobile drive unit 20 as a whole.

The drive module 120 propels the mobile drive unit 20 and, when the mobile drive unit 20 and the inventory holder 30 are docked, the inventory holder 30. The drive module 120 may represent any appropriate collection of components operable to propel the mobile drive unit 20. For example, in the illustrated example, the drive module 120 includes a motorized axle 122, a pair of motorized wheels 124, and a pair of stabilizing wheels 126. One motorized wheel 124 is located at each end of the motorized axle 122, and one stabilizing wheel 126 is positioned at each end of the mobile drive unit 20.

The docking head assembly 130b moves the platform 110 towards the inventory holder 30 to facilitate docking of the mobile drive unit 20 and the inventory holder 30. The docking head assembly 130b may also be capable of adjusting the position or orientation of the platform 110 in other suitable manners to facilitate docking. The docking head assembly 130b may include any appropriate components, based on the configuration of the mobile drive unit 20 and the inventory holder 30, for moving the platform 110 or otherwise adjusting the position or orientation of the platform 110. For example, in the illustrated example, the docking head assembly 130b includes a motorized shaft (not shown) attached to the center of the platform 110. The motorized shaft is operable to lift the platform 110 as appropriate for docking with the inventory holder 30.

The drive module 120 may be configured to propel the mobile drive unit 20 in any appropriate manner. For example, in the illustrated example, the motorized wheels 124 are operable to rotate in a first direction to propel the mobile drive unit 20 in a forward direction. The motorized wheels 124 are also operable to rotate in a second direction to propel the mobile drive unit 20 in a backward direction. In the illustrated example, the drive module 120 is also configured to rotate the mobile drive unit 20 by rotating the motorized wheels 124 in different directions from one another or by rotating the motorized wheels 124 at different speeds from one another.

The position sensor 140 represents one or more sensors, detectors, or other components suitable for determining the location of the mobile drive unit 20 in any appropriate manner. For example, in some examples, the workspace 70 associated with the inventory system 10 includes a number of fiducial marks that mark points on a two-dimensional grid that covers all or a portion of the workspace 70. In such examples, the position sensor 140 may include a camera and suitable image- and/or video-processing components, such as an appropriately-programmed digital signal processor, to allow the position sensor 140 to detect fiducial marks within the camera's field of view. The control module 170 may store location information that the position sensor 140 updates as the position sensor 140 detects fiducial marks. As a result, the position sensor 140 may utilize fiducial marks to maintain an accurate indication of the location of the mobile drive unit 20 and to aid in navigation when moving within the workspace 70.

The holder sensor 150 represents one or more sensors, detectors, or other components suitable for detecting the inventory holder 30 and/or determining, in any appropriate manner, the location of the inventory holder 30, as an absolute location or as a position relative to the mobile drive unit 20. The holder sensor 150 may be capable of detecting the location of a particular portion of the inventory holder 30 or the inventory holder 30 as a whole. The mobile drive unit 20 may then use the detected information for docking with or otherwise interacting with the inventory holder 30.

The obstacle sensor 160 represents one or more sensors capable of detecting objects located in one or more different directions in which the mobile drive unit 20 is capable of moving. The obstacle sensor 160 may utilize any appropriate components and techniques, including optical, radar, sonar, pressure-sensing and/or other types of detection devices appropriate to detect objects located in the direction of travel of the mobile drive unit 20. In some examples, the obstacle sensor 160 may transmit information describing objects it detects to the control module 170 to be used by the control module 170 to identify obstacles and to take appropriate remedial actions to prevent the mobile drive unit 20 from colliding with obstacles and/or other objects.

The obstacle sensor 160 may also detect signals transmitted by other mobile drive units 20 operating in the vicinity of the illustrated mobile drive unit 20. For example, in some examples of the inventory system 10, one or more mobile drive units 20 may include an identification signal transmitter 162 that transmits a drive identification signal. The drive identification signal indicates to the other mobile drive units 20 that the object transmitting the drive identification signal is in fact a mobile drive unit. The identification signal transmitter 162 may be capable of transmitting infrared, ultraviolet, audio, visible light, radio, and/or other suitable signals that indicate to recipients that the transmitting device is a mobile drive unit 20.

Additionally, in some examples, the obstacle sensor 160 may also be capable of detecting state information transmitted by the other mobile drive units 20. For example, in some examples, the identification signal transmitter 162 may be capable of including state information relating to the mobile drive unit 20 in the transmitted identification signal. This state information may include, but is not limited to, the position, velocity, direction, and the braking capabilities of the transmitting mobile drive unit 20. In some examples, the mobile drive unit 20 may use the state information transmitted by other mobile drive units to avoid collisions when operating in close proximity with those other mobile drive units.

The control module 170 monitors and/or controls operation of the drive module 120 and the docking head assembly 130b. The control module 170 may also receive information from sensors such as the position sensor 140 and the holder sensor 150 and adjust the operation of the drive module 120, the docking head assembly 130b, and/or other components of the mobile drive unit 20 based on this information.

Additionally, in some examples, the mobile drive unit 20 may be configured to communicate with a management device of the inventory system 10 and the control module 170 may receive commands transmitted to the mobile drive unit 20 and communicate information back to the management device utilizing appropriate communication components of the mobile drive unit 20. The control module 170 may include any appropriate hardware and/or software suitable to provide the described functionality. In some examples, the control module 170 includes a general-purpose microprocessor programmed to provide the described functionality. Additionally, the control module 170 may include all or portions of the docking head assembly 130b, the drive module 120, the position sensor 140, and/or the holder sensor 150, and/or share components with any of these elements of the mobile drive unit 20.

Moreover, in some examples, the control module 170 may include hardware and software located in components that are physically distinct from the device that houses the drive module 120, the docking head assembly 130b, and/or the other components of the mobile drive unit 20 described above. For example, in some examples, each mobile drive unit 20 operating in the inventory system 10 may be associated with a software process (referred to here as a "drive agent") operating on a server that is in communication with the device that houses the drive module 120, the docking head assembly 130b, and other appropriate components of the mobile drive unit 20. This drive agent may be responsible for requesting and receiving tasks, requesting and receiving routes, transmitting state information associated with the mobile drive unit 20, and/or otherwise interacting with the management module 15 and other components of the inventory system 10 on behalf of the device that physically houses the drive module 120, the docking head assembly 130b, and the other appropriate components of the mobile drive unit 20. As a result, for the purposes of this description and the claims that follow, the term "mobile drive unit" includes software and/or hardware, such as agent processors, that provides the described functionality on behalf of the mobile drive unit 20 but that may be located in physically distinct devices from the drive module 120, the docking head assembly 130b, and/or the other components of the mobile drive unit 20 described above.

While FIGS. 4 and 5 illustrate a particular example of the mobile drive unit 20 containing certain components and configured to operate in a particular manner, the mobile drive unit 20 may represent any appropriate component and/or collection of components configured to transport and/or facilitate the transport of the inventory holders 30. As another example, the mobile drive unit 20 may represent part of an overhead crane system in which one or more crane assemblies are capable of moving within a network of wires or rails to a position suitable to dock with a particular inventory holder 30. After docking with the inventory holder 30, the crane assembly may then lift the inventory holder 30 and move inventory to another location for purposes of completing an assigned task.

Furthermore, in some examples, the mobile drive unit 20 may represent all or a portion of the inventory holder 30. The inventory holder 30 may include motorized wheels or any other components suitable to allow the inventory holder 30 to propel itself. As one specific example, a portion of the inventory holder 30 may be responsive to magnetic fields. The inventory system 10 may be able to generate one or more controlled magnetic fields capable of propelling, maneuvering and/or otherwise controlling the position of the inventory holder 30 as a result of the responsive portion of the inventory holder 30. In such examples, the mobile drive unit 20 may represent the responsive portion of the inventory holder 30 and/or the components of the inventory system 10 responsible for generating and controlling these magnetic fields. While this description provides several specific examples, the mobile drive unit 20 may, in general, represent any appropriate component and/or collection of components configured to transport and/or facilitate the transport of the inventory holders 30.

Figure 6:
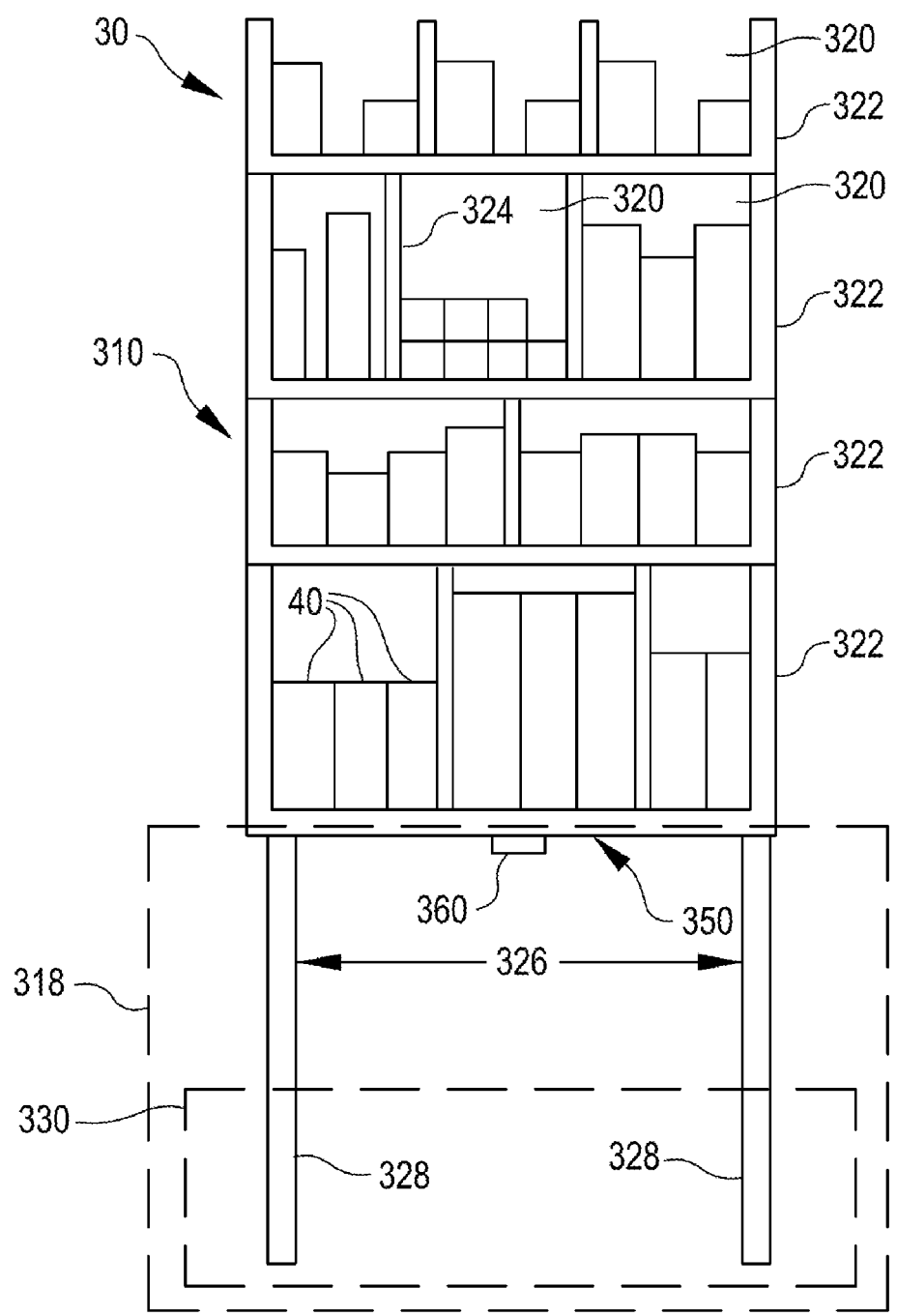
FIG. 6 illustrates in greater detail an example inventory holder that may be utilized in some examples of the inventory system shown in FIG. 3.

FIG. 6 illustrates in greater detail the components of a particular example of the inventory holder 30. In particular, FIG. 6 illustrates the structure and contents of one side of an example inventory holder 30. In a particular example, the inventory holder 30 may comprise any number of faces with similar or different structure. As illustrated, the inventory holder 30 includes a frame 310, a plurality of legs 328, and a docking surface 350.

The frame 310 holds the inventory items 40. The frame 310 provides storage space for storing the inventory items 40 external or internal to the frame 310. The storage space provided by the frame 310 may be divided into a plurality of inventory bins 320, each capable of holding the inventory items 40. The inventory bins 320 may include any appropriate storage elements, such as bins, compartments, or hooks.

In a particular example, the frame 310 is composed of a plurality of trays 322 stacked upon one another and attached to or stacked on a base 318. In such an example, the inventory bins 320 may be formed by a plurality of adjustable dividers 324 that may be moved to resize one or more inventory bins 320. In alternative examples, the frame 310 may represent a single inventory bin 320 that includes a single tray 322 and no adjustable dividers 324. Additionally, in some examples, the frame 310 may represent a load-bearing surface mounted on mobility element 330. The inventory items 40 may be stored on such an inventory holder 30 by being placed on the frame 310. In general, the frame 310 may include internal and/or external storage space divided into any appropriate number of the inventory bins 320 in any appropriate manner.

Additionally, in a particular example, the frame 310 may include a plurality of device openings 326 that allow the mobile drive unit 20 to position the platform 110 adjacent the docking surface 350. The size, shape, and placement of the device openings 326 may be determined based on the size, the shape, and other characteristics of the particular example of the mobile drive unit 20 and/or the inventory holder 30 utilized by the inventory system 10. For example, in the illustrated example, the frame 310 includes four legs 328 (e.g., 328a, 328b, 328c, and 328d) that form the device openings 326 and allow the mobile drive unit 20 to position the mobile drive unit 20 under the frame 310 and adjacent to the docking surface 350. The length of the legs 328 may be determined based on a height of the mobile drive unit 20.

The docking surface 350 comprises a portion of the inventory holder 30 that couples to, abuts, and/or rests upon a portion of the platform 110, when the mobile drive unit 20 is docked to the inventory holder 30. Additionally, the docking surface 350 supports a portion or all of the weight of the inventory holder 30 while the inventory holder 30 is docked with the mobile drive unit 20. The composition, shape, and/or texture of the docking surface 350 may be designed to facilitate maneuvering of the inventory holder 30 by the mobile drive unit 20. For example, as noted above, in some examples, the docking surface 350 may comprise a high-friction portion. When the mobile drive unit 20 and the inventory holder 30 are docked, frictional forces induced between the platform 110 and this high-friction portion may allow the mobile drive unit 20 to maneuver the inventory holder 30. In some examples, dynamically adjusting a mounting angle of the platform 110 as described herein may provide increased traction between the docking surface 350 and the platform 110 because the mounting angle may be optimized for stability of the inventory holder 30. Additionally, in some examples, the docking surface 350 may include appropriate components suitable to receive a portion of the platform 110, couple the inventory holder 30 to the mobile drive unit 20, and/or facilitate control of the inventory holder 30 by the mobile drive unit 20.

Holder identifier 360 marks a predetermined portion of the inventory holder 30 and the mobile drive unit 20 may use the holder identifier 360 to align with the inventory holder 30 during docking and/or to determine the location of the inventory holder 30. More specifically, in some examples, the mobile drive unit 20 may be equipped with components, such as the holder sensor 150, that can detect the holder identifier 360 and determine its location relative to the mobile drive unit 20. As a result, the mobile drive unit 20 may be able to determine the location of the inventory holder 30 as a whole. For example, in some examples, the holder identifier 360 may represent a reflective marker that is positioned at a predetermined location on the inventory holder 30 and that the holder sensor 150 can optically detect using an appropriately-configured camera.

Depending on the configuration and characteristics of the mobile drive unit 20 and the inventory system 10, the mobile drive unit 20 may move the inventory holder 30 using a variety of appropriate methods. In a particular example, the mobile drive unit 20 is capable of moving the inventory holder 30 along a two-dimensional grid, combining movement along straight-line segments with ninety-degree rotations and arcing paths to transport the inventory holder 30 from the first location to the second location. Additionally, while moving, the mobile drive unit 20 may use fixed objects located in the workspace as reference points to assist in navigation. For example, in some examples, the inventory system 10 includes multiple fiducial marks. The mobile drive unit 20 may be configured to detect the fiducial marks and to determine the location of the mobile drive unit 20 and/or measure its movement based on the detection of the fiducial marks.

After the mobile drive unit 20 arrives at the second location, the mobile drive unit 20 may perform appropriate operations to facilitate access to inventory items 40 stored in the inventory holder 30. For example, the mobile drive unit 20 may rotate the inventory holder 30 to present a particular face of the inventory holder 30 to an operator of the inventory system 10 or other suitable party, such as a packer selecting the inventory items 40 from the inventory holder 30. The mobile drive unit 20 may also undock from the inventory holder 30. Alternatively, instead of undocking at the second location, the mobile drive unit 20 may transport the inventory holder 30 back to the first location or to a third location after any appropriate actions have been taken involving the inventory items 40. For example, after a packer has removed particular inventory items 40 from the inventory holder 30, the mobile drive unit 20 may return the inventory holder 30 to its original storage location, a new storage location, or another inventory station. The mobile drive unit 20 may then undock from inventory holder 30 at this new location.

As introduced above, examples herein are directed to an inventory system having multiple inventory holders and drive units for moving the inventory holders. Specifically, features herein are directed to the inventory movement system including a mobile drive unit configured to move an inventory holder and to account for various forces acting on the inventory holder in order to increase stability of the inventory holder.

Figure 7:
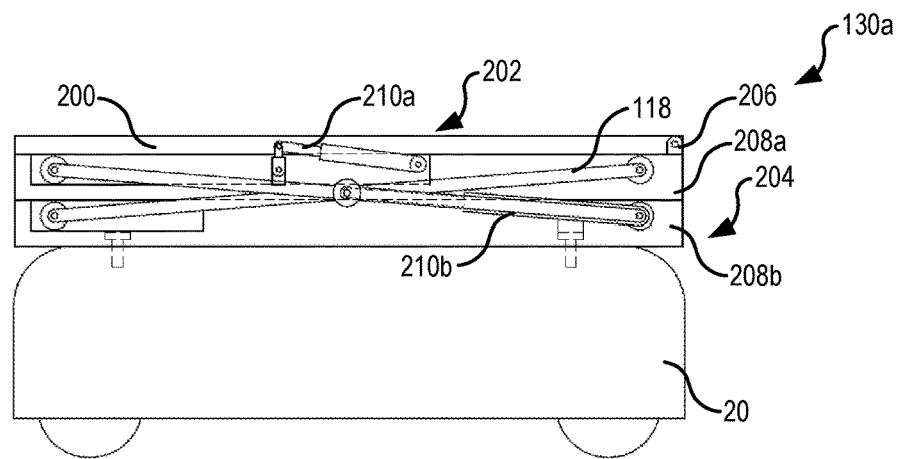
FIG. 7 illustrates a side view of an example mobile drive unit including an example docking head assembly in a retracted position, according to at least one example.
Figure 8:
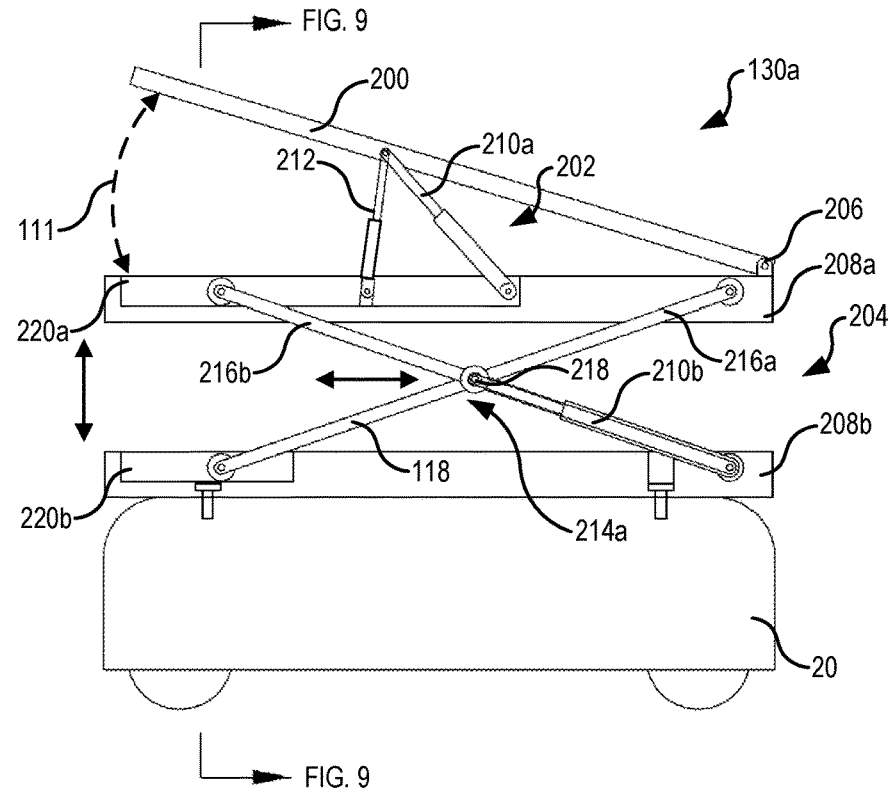
FIG. 8 illustrates a side view of the example mobile drive unit including the example docking head assembly from FIG. 7 in an extended and tilted position, according to at least one example.
Figure 9:
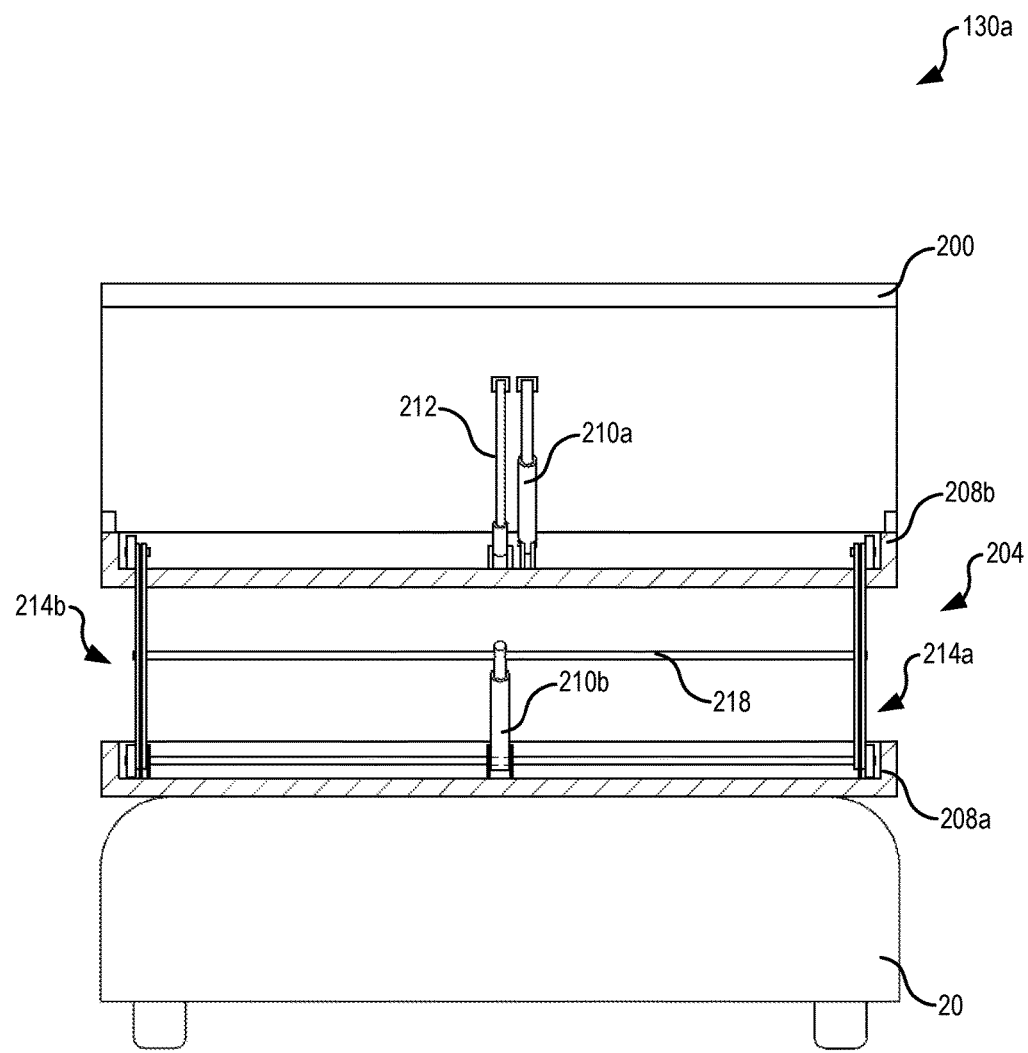
FIG. 9 illustrates a back view of the example mobile drive unit including the example docking head assembly from FIG. 8, according to at least one example.

As described above, examples herein are directed to devices, systems, and techniques to enable mobile drive units to traverse inclined ramps when laden with inventory holders. To this end, FIGS. 7-9 illustrate various views of the mobile drive unit 20 including the docking head assembly 130a adapted for lifting and tilting of the inventory holder 30. In particular, FIG. 7 illustrates the docking head assembly 130a in a retracted position, and FIG. 8 illustrates the docking head assembly 130a in an extended and tilted position. FIG. 9 illustrates a back view of the mobile drive unit 20 including the docking head assembly 130a from FIG. 8.

The docking head assembly 130 may include a docking platform 200, a tilting mechanism 202, and a lifting mechanism 204. The platform 110 is an example of the docking platform 200. Thus, the docking platform 200 may include any suitable properties and/or components as described with reference to the platform 110. For example, the docking platform 200 may include a holder sensor disposed on a top portion of the docking platform 200 for use when coupling with and decoupling from the inventory holder 30. The docking platform 200 may be pivotably coupled to an upper frame 208a of the lifting mechanism 204 at a pivot point 206. The pivot point 206 may be any suitable hinge joint that enables pivotable movement of the docking platform 200 with respect to the lifting mechanism 204.

The tilting mechanism 202 may be disposed between the docking platform 200 and the lifting mechanism 204. An actuator 210a of the tilting mechanism 202 may extend between the docking platform 200 and the upper frame 208a of the lifting mechanism 204. The actuator 210a may provide a suitable force to cause the docking platform 200 to move between the two states illustrated in FIGS. 7 and 8 (e.g., tilt the docking platform 200 through the tilt angle 111). The tilt angle 111 may have any suitable value depending on the application. In some examples, the tilt angle 111 may represent a maximum rotation for the docking platform 200, and the actuator 210a may hold the docking platform 200 at angles having any suitable value between the maximum tilt angle and zero (e.g., no tilt). In some examples, the tilting mechanism 202 also includes a support member 212 configured to support the docking platform 200 as the actuator 210a actuates the docking platform 200. The support member 212 may follow the same path as the actuator 210a. In some examples, the support member 212 may function as a brake or lock to hold the docking platform 200 at a fixed angle. In some examples, the support member 212 may include a mechanical safety that functions to mechanically support the docking platform 200 at as the docking platform 200 is tilted. For example, the support member 212 may include a spring-loaded tooth and a series of grooves. As actuator 210a is extended, the spring-loaded tooth may selectively engage with the series of grooves (e.g., one groove after another as the actuator 210a is extended). Thus, in the event the actuator 210a were to fail, the support member 212 may hold the docking platform 200 at an angle corresponding to the last groove at which the spring-loaded tooth engaged.

The lifting mechanism 204 may be disposed between the tilting mechanism 202 and the mobile drive unit 20. In some examples, the lifting mechanism 204 may include the upper frame 208a and a corresponding lower frame 208b. Via the lower frame 208b, the lifting mechanism 204 and therefore the docking head assembly 130a may be attached to a frame of the mobile drive unit 20. In some examples, the docking head assembly 130a may be removable from the mobile drive unit 20. For example, the docking head assembly 130a may be exchanged for the docking head assembly 130b or some other docking head assembly. Via the upper frame 208a, the tilting mechanism 202 may be attached to the lifting mechanism 204.

The frames 208 may be attached to each other via one or more scissor links 214. In FIG. 8, a single scissor link 214a is illustrated. In FIG. 9, two scissor links 214a, 214b are illustrated. Each scissor link 214 may include at least two link members 216a, 216b. Depending on the implementation, each scissor link 214 may include more than two link members 216 (e.g., to form a stack of scissor links). The scissor links 214 may be attached at an axle 218. In some examples, the axle 218 may extend between two or more scissor links 214, as illustrated in FIG. 9. In some examples, each scissor link 214 may include its own axle 218. A first end of each link member 216 may be slidably coupled to one of the frames 208 at a slide track 220, e.g., by using a mechanical articulating joint held in sliding carrier. A second, opposite end of each link member 216 may be pivotably coupled to one of the frames 208 using a mechanical articulating joint. For example, a first end of the link member 216a may be attached to upper frame 208a at the slide track 220a and a second end of the link member 216a may be attached to the lower frame 208b. As illustrated in FIG. 9, the actuator 210b may assert its force at the axle 218 or at some location adjacent to the axle 218 (e.g., at a location elevated above the axle 218). In some examples, the actuator 210b is installed adjacent to one of the link members 216. The actuators 210 may be any suitable actuator configured to perform the techniques described herein. For example, the actuators 210 may be electrical, hydraulic, pneumatic, and/or mechanical. In some examples, the actuators 210 may be screw type, wheel and axle type, cam type, telescoping type, cylindrical type, rigid chain type, and any other suitable type. In some examples, the actuators 210 may be powered by an onboard power supply of the mobile drive unit 20.

In some examples, the docking head assembly 130a may include one or more sensors configured to measure or detect forces or loads exerted on the docking head assembly 130a when the inventory holder 30 is coupled to the mobile drive unit 20 via the docking platform 200. The one or more sensors may be in communication with the management module 15. Sensor data sensed by the one or more sensors may be used by the management module 15 to determine a location of a center of gravity of the inventory holder 30 or mass, weight, or load corresponding to the inventory holder 30. For example, the management module 15 may access the sensor data received from each of the one or more sensors and, based on the relative forces sensed by the one or more sensors, the management module 15 may determine a location of the center of gravity of the inventory holder 30. In some examples, the one or more sensors may be configured to measure the position of components of the docking head assembly 130a. For example, a particular sensor may detect that a particular linear actuator (e.g., 210a) has traveled a certain distance. From this detection and the geometry of the components of the docking head assembly 130a, the tilt angle 111 may be determined and an adjusted tilt angle 111 may be determined, along with other determinations, e.g., a position of the inventory holder 30 relative to the mobile drive unit 20, a location of the center of gravity of the inventory holder 30, or any other suitable determination. As an additional example, a particular sensor may detect that the actuator 210*b* has traveled a certain distance. From this detection and the geometry of the components of the docking head assembly 130*a*, an elevation of the lifting mechanism 204 with respect to the mobile drive unit 20 may be determined.

In some examples, the mobile drive unit 20 may also include one or more movement sensors configured to measure or detect movements of the mobile drive unit 20. For example, the one or more movement sensors may be configured to measure angular velocity with respect to X, Y, and Z axes, inclination (e.g., pitch, roll, and yaw) values with respect to X, Y, and Z axes, and acceleration and deceleration with respect to the X, Y, and Z axes. Thus, in some examples, the one or more movement sensors may include variations of accelerometers, gyroscope sensors, inclination sensors, and any other suitable sensor for measuring movements of the mobile drive unit 20. In some examples, the one or more movement sensors may be optical sensors configured to detect angular variations of a surface on which the mobile drive unit 20 operates or displacement sensors configured to measure displacement of components of the mobile drive unit 20 relative to the surface or in an absolute manner. For example, sensor data from such optical sensors and/or movement sensors may be used to update ramp data associated with a particular inclined ramp.

Figure 10:
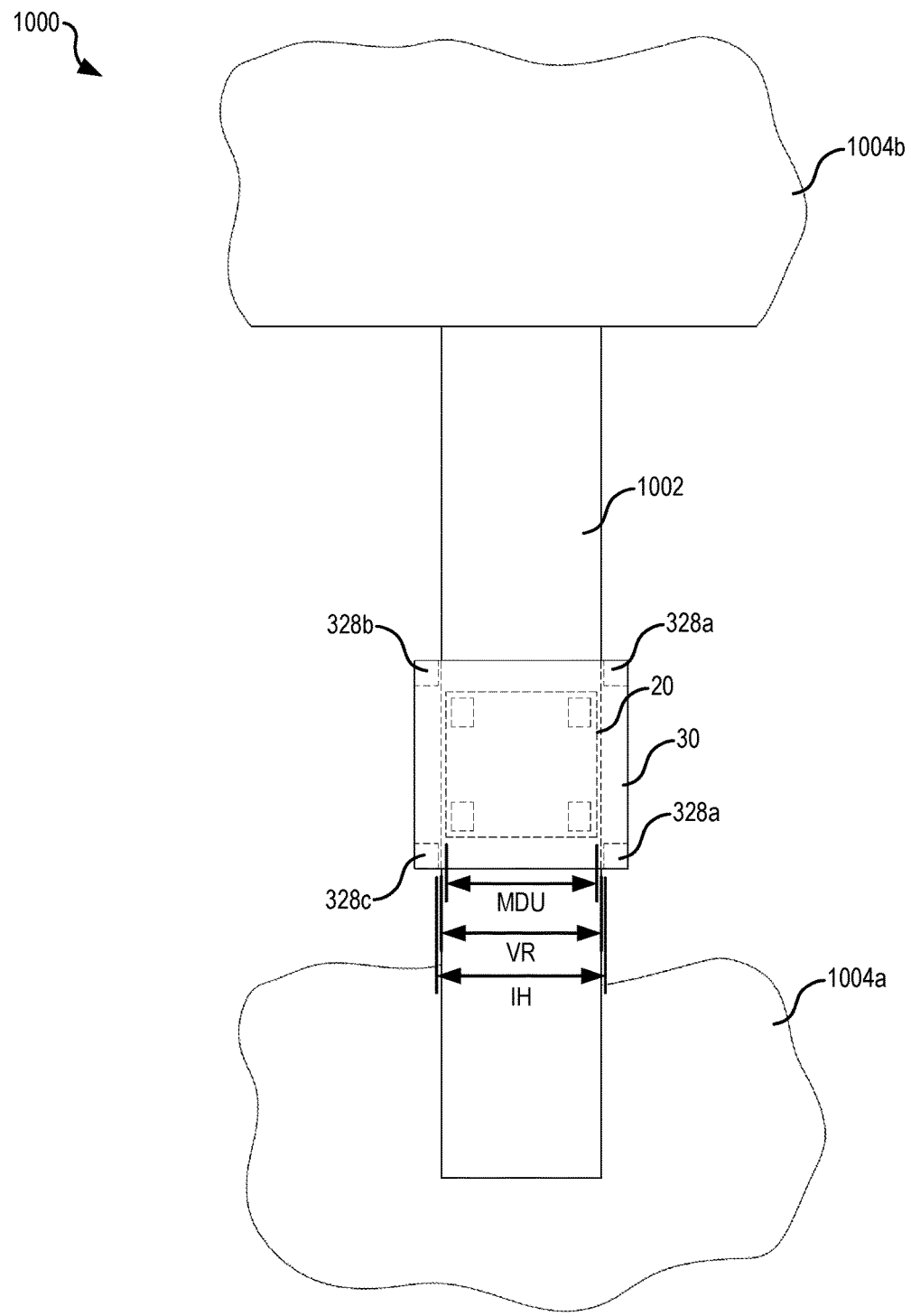
FIG. 10 illustrates a top view of an inventory system including a mobile drive unit traversing an inclined ramp extending between two floors, according to at least one example.

FIG. 10 illustrates a top view of an inventory system 1000 including the mobile drive unit 20 including the docking head assembly 130*a* (e.g., a ramp mobile drive unit) and the inventory holder 30 traversing an inclined ramp 1002 extending between two floors 1004*a*, 1004*b*. To provide for the docking head assembly 130*a* to lower the inventory holder 30 while on the inclined ramp 1002, the elements of the inventory system 1000 may be sized as described herein. In particular, the mobile drive unit 20 may have a width MDU, the inclined ramp 1002 may have a width VR, and the inventory holder 30 may have a width IH measured between the legs 328. The width VR may be less than the width MDU and the width IH, and the width IH may be greater than both the width VR and the width MDU (e.g., MDU<VR<IH). In this manner, the inclined ramp 1002 is sized such that the mobile drive unit 20 can drive thereon and such that the legs 328 of the inventory holder 30 can be lowered below an upper surface of the inclined ramp 1002. This may provide for improved stability while the mobile drive unit 20 traverses the inclined ramp 1002 with the inventory holder 30.

The inclined ramp 1002 may include fiducials to demarcate edges of the inclined ramp 1002. The fiducials may be used by the mobile drive unit 20 to ensure that the mobile drive unit 20 safely transports the inventory holder 30 along the inclined ramp 1002. As described herein, the fiducials may demarcate transitions zones where the inclined ramp 1002 transitions from the floor 1004*a* and/or the floor 1004*b*. In some examples, one or more lines may be painted or otherwise applied on the surface of the inclined ramp 1002. The one or more lines may be used by the mobile drive unit 20 (e.g., by detecting the lines via infrared sensors of the mobile drive unit 20) to ensure that the mobile drive unit 20 safely transports the inventory holder 30 along the inclined ramp 1002. In some examples, the mobile drive unit 20 may include an obstacle detection system. This obstacle detection system may include one or more depth sensors (e.g., time of flight lasers or other sensors) configured to detect edges of the inclined ramp 1002. The obstacle detection system may be used by the mobile drive unit 20 to ensure that the mobile drive unit 20 safely transports the inventory holder 30 along the inclined ramp 1002.

If, at any point in time, the mobile drive unit 20 traveling up the inclined ramp 1002 detects, using a docking platform orientation sensor, that the docking platform 200 deviates significantly from the parallel orientation with respect to the ground, a fail-safe mechanism may be triggered such that the mobile drive unit 20 immediately comes to a full stop. In some examples, the mobile drive unit 20 can attempt a final, steady approach to exit the inclined ramp 1002 from the nearest exit (self-recovery) and/or, if it is determined within some tolerance that the mobile drive unit 20 cannot drive and/or can no longer self-recover, then a recovery protocol may be triggered. This recovery protocol may include signaling trained warehouse operators to take manual actions with respect to recovering the mobile drive unit 20.

Figure 11:
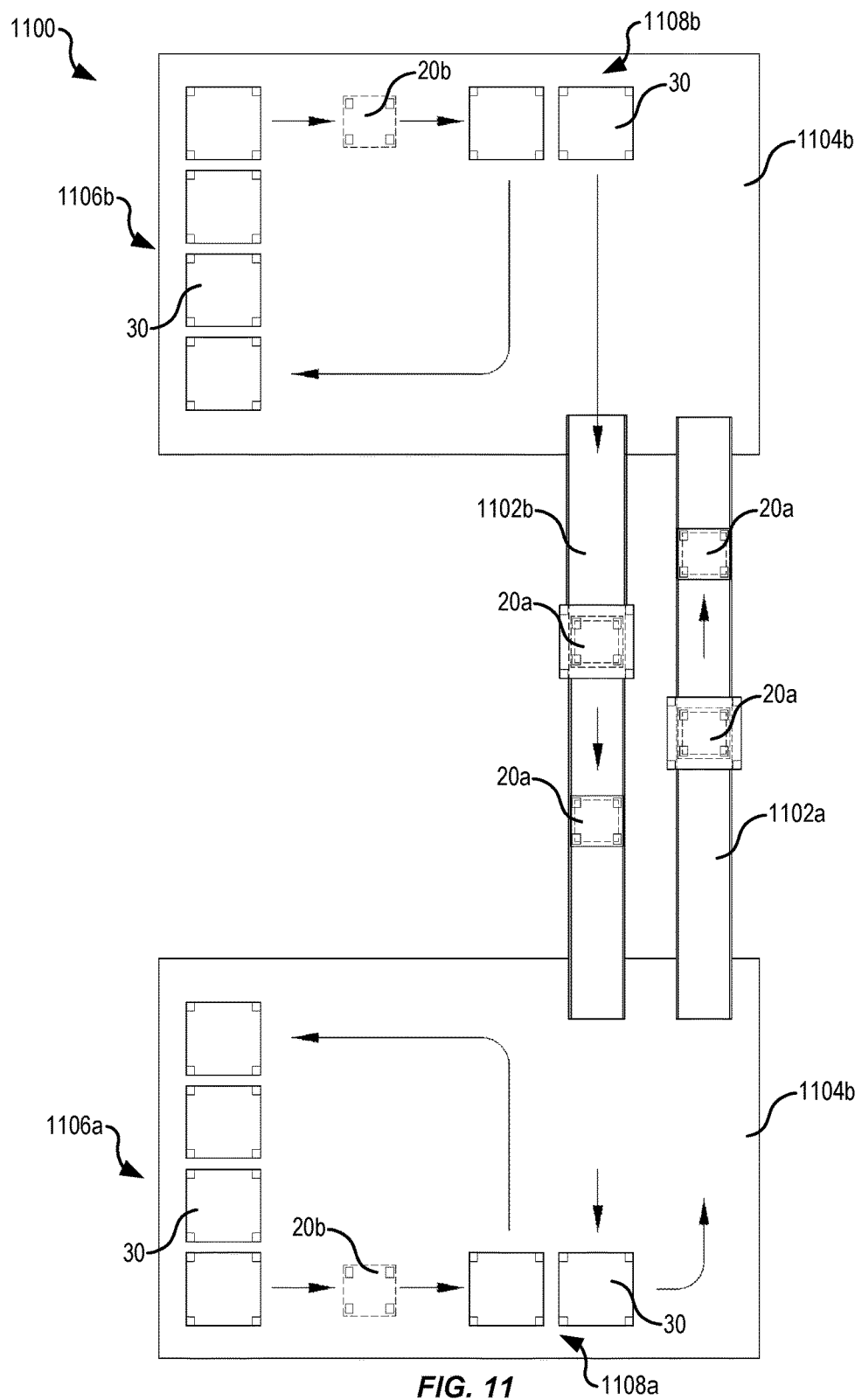
FIG. 11 illustrates a top view of an inventory system including different types of mobile drive units traversing inclined ramps extending between two floors, according to at least one example.

FIG. 11 illustrates a top view of an inventory system 1100 including ramp mobile drive units 20*a* (e.g., mobile drive units 20 including docking head assemblies 130*a*) and floor mobile drive units 20*b* (e.g., mobile drive units 20 including docking head assemblies 130*b*) interacting on and between two floors 1104*a*, 1104*b*. The two floors 1104 may be connected via one or more inclined ramps 1102. For example, an inclined ramp 1102*a* may be configured for traffic flowing from the floor 1104*a* to the floor 1104*b*, while the inclined ramp 1102*b* may be configured for traffic flowing in the opposite direction (e.g., from the floor 1104*b* to the floor 1104*a*). The floor mobile drive units 20*b* may be configured to move inventory holders 30 between different locations on the floors 1104. For example, the floor mobile drive unit 20*b* located on the floor 1104*a* may move the inventory holders 30 between a storage location 1106*a* and a ramp queue 1108*a*. The ramp mobile drive units 20*a* may move the inventory holders 30 between the ramp queues 1108 or as otherwise instructed. In this manner, the floor mobile drive units 20*b* may focus on executing intra-floor tasks and the ramp mobile drive units 20*a* may focus on executing inter-floor tasks.

Figure 12:
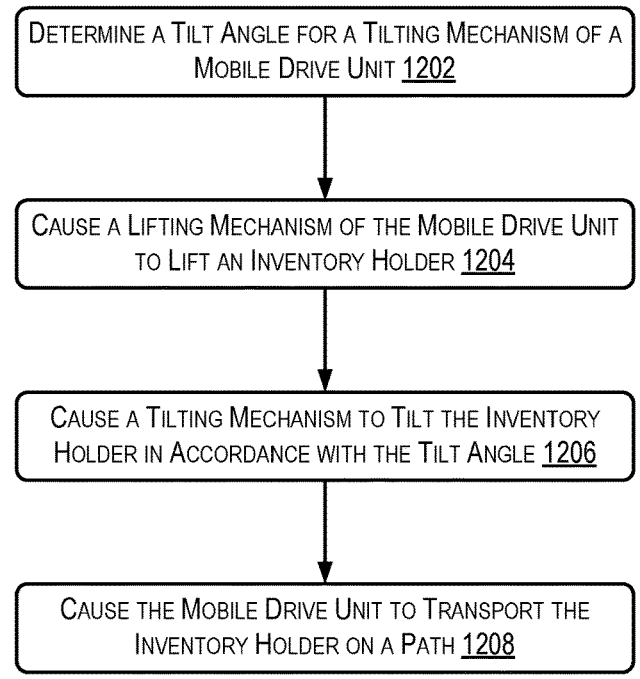
FIG. 12 illustrates a flow diagram depicting example acts for implementing techniques relating to tilting inventory holders for inclined ramp traversal as described herein, according to at least one example.
Figure 13:
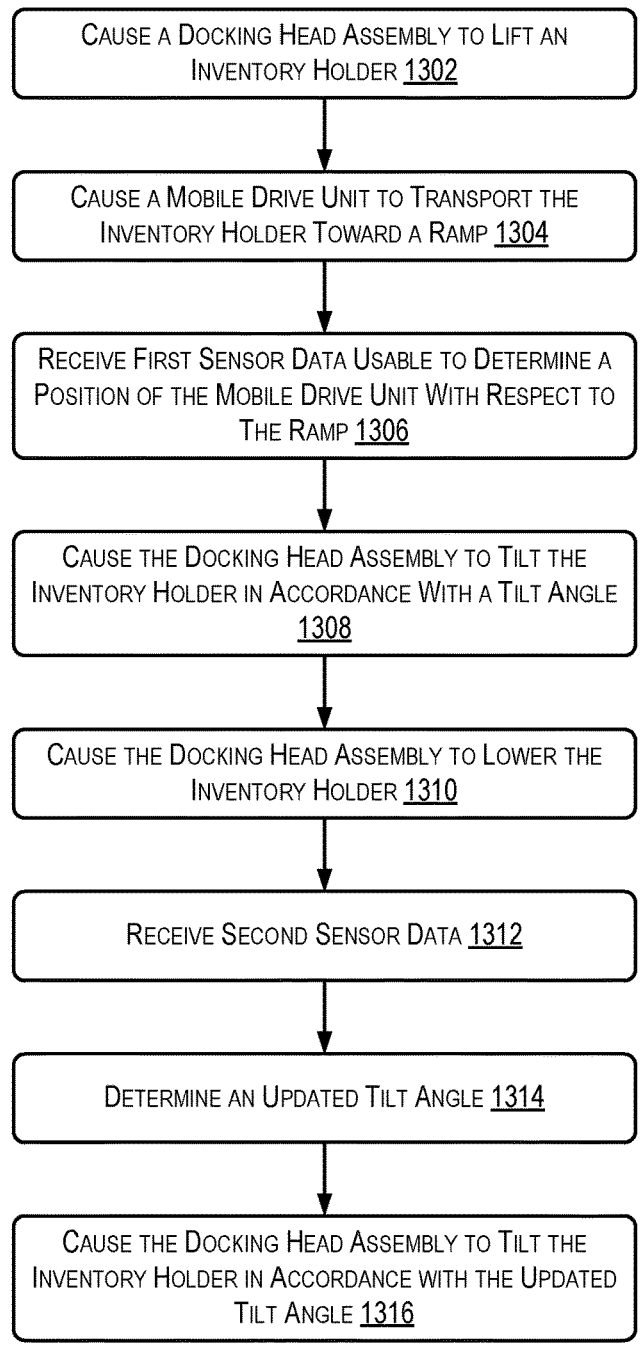
FIG. 13 illustrates a flow diagram depicting example acts for implementing techniques relating to tilting inventory holders for inclined ramp traversal as described herein, according to at least one example.
Figure 14:
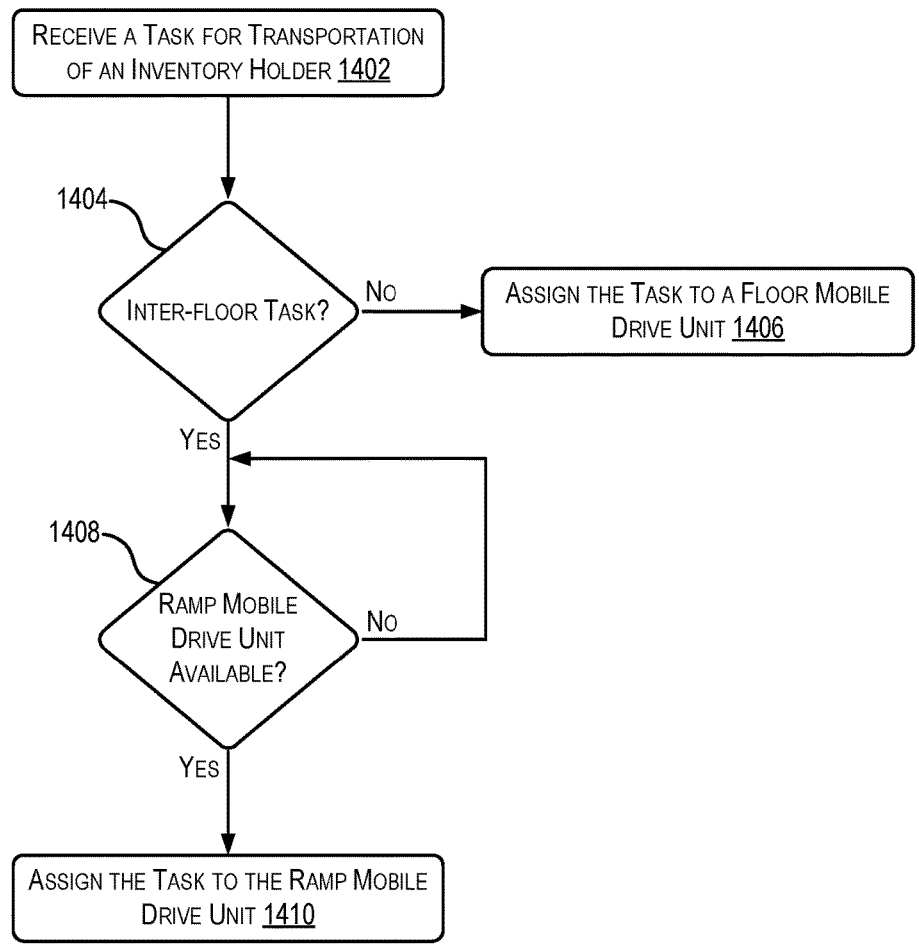
FIG. 14 illustrates a flow diagram depicting example acts for implementing techniques relating to assigning transportation tasks to mobile drive units, according to at least one example.

FIGS. 12, 13, and 14 illustrate example flow diagrams showing respective processes 1200, 1300, and 1400 as described herein. The processes 1200, 1300, and 1400 are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement the processes. The order in which the operations are described is not intended to be construed as a limitation, and any number of the described operations can be omitted or combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium is non-transitory.

FIG. 12 illustrates a flow diagram depicting the process 1200 for implementing techniques relating to tilting inventory holders for inclined ramp traversal, according to at least one example. The management module 15 (FIG. 3) may perform the process 1200 of FIG. 12.

The process 1200 begins at 1202 by determining a tilt angle for a tilting mechanism of a mobile drive unit. Determining the tilt angle may be based at least in part on path data that is associated with a path extending between a first floor and a second floor. In some examples, the path data may be stored in association with a facility map that includes the path. In some examples, the tilt angle may be about equal to or equal to a path angle measured between a horizontal plane of the first floor and a non-horizontal plane of the path.

At 1204, the process 1200 causes a lifting mechanism of the mobile drive unit to lift a inventory holder. In some examples, the lifting may be performed with respect to a horizontal axis of the mobile drive unit. For example, the horizontal axis may correspond to a horizontal frame of the mobile drive unit.

At 1206, the process 1200 causes the tilting mechanism to tilt the inventory holder in accordance with the tilt angle. In some examples, the tilting may be performed with respect to the horizontal axis. For example, the tilt angle may be measured with respect to the horizontal axis. In some examples, the tilting mechanism is configured to tilt the inventory holder while the mobile drive unit moves along at least a portion of the path. In some examples, the tilting mechanism may be configured to tilt the inventory holder at an angular velocity that corresponds to a velocity of the mobile drive unit.

At 1208, the process 1200 causes the mobile drive unit to transport the inventory holder on a path. In some examples, the path may be the path that extends between a first floor and a second floor. In this manner, the path may be an inclined ramp. The mobile drive unit may transport the inventory holder with the inventory holder tilted in accordance with the tilt angle. Thus, the inventory holder may be tilted during at least a portion of the transportation.

In some examples, the process 1200 may further include receiving sensor data from a sensor of the mobile drive unit. The sensor data may be descriptive of a sensed angle of the mobile drive unit with respect to a reference surface. In some examples, the process 1200 may further include updating the path data based at least in part on the sensor data. This may include updating the path data in the facility map to reflect the sensed angle. In some examples, the sensor is a gyro sensor. In this example, the method may further include determining an updated tilt angle based at least in part on the sensor data, and causing the tilting mechanism to tilt the inventory holder in accordance with the updated tilt angle at least while the mobile drive unit is located on the path. For example, the sensor data may be gathered while the mobile drive unit is moving along the path. Based on this sensor data, the inventory holder can be tilted to correspond to the sensed angle instead of or in addition to the angle represented by the path data.

In some examples, the process 1200 may further include, after a leading portion of the mobile drive unit is on the path, causing the lifting mechanism to lower the inventory holder at or about the same time as the tilting mechanism tilts the inventory holder in accordance with the tilt angle. This may result in the inventory holder being moved to a lower elevation, which may result in a more stable orientation for the inventory holder. In some examples, the process 1200 may further include, prior to causing the lifting mechanism to lower the inventory holder: receiving sensor data representative of a position of the mobile drive unit with respect to the path, and determining that the leading portion of the mobile drive unit is on the path based at least in part on the sensor data.

In some examples, the mobile drive unit may be considered a ramp mobile drive unit. In this example, the process 1200 may further include causing a floor mobile drive unit to transport the inventory holder to a first position on the first floor proximate to the path prior to causing the lifting mechanism of the mobile drive unit to lift the inventory holder.

FIG. 13 illustrates a flow diagram depicting the process 1300 for implementing techniques relating to tilting inventory holders for inclined ramp traversal, according to at least one example. The management module 15 (FIG. 3) may perform the process 1300 of FIG. 13.

The process 1300 begins at 1302 by causing a docking head assembly to lift an inventory holder. In this manner, a mobile drive unit to which the docking head assembly is connected may detachably couple with the inventory holder. Lifting the inventory holder may include lifting the inventory holder at least until legs of the inventory holder are no longer in contact with a support surface (e.g., a floor of a warehouse). In some examples, a lifting mechanism of the docking head assembly may be used to lift the inventory holder. This may include instructing the lifting mechanism of the docking head assembly to lift the inventory holder.

At 1304, the process 1300 causes a mobile drive unit to transport the inventory holder toward a ramp. This may include instructing the mobile drive unit to transport the inventory holder in accordance with a task. The task may include a set of directions and a set of action instructions. For example, the task may include action instructions for lifting the inventory holder and directions for moving the inventory holder from a first floor to a second floor along a ramp.

At 1306, the process 1300 receives first sensor data usable to determine a position of the mobile drive unit with respect to the ramp. This sensor data may be gathered by an optical sensor or any other suitable sensor (e.g., relative position sensor). For example, the optical sensor may detect one or more fiducials disposed at or about the ramp. The fiducials may represent different portions of the ramp. For example, the fiducials may represent a beginning of the ramp, edges of the ramp, an end of the ramp, and any other suitable portion.

At 1308, the process 1300 causes the docking head assembly to tilt the inventory holder in accordance with a tilt angle. This may be performed in response to determining the position of the mobile drive unit based on the sensor data. For example, the docking head assembly may tilt the inventory holder at a position when the mobile drive unit begins to traverse the ramp. Thus, the timing of the tilting may be correlated to the position of the mobile drive unit with respect to the ramp. In some examples, a tilting mechanism of the docking head assembly may be used to tilt the inventory holder in accordance with the tilt angle. This may include instructing the tilting mechanism of the docking head assembly to tilt the inventory holder. In some examples, the tilt angle may be determined in accordance with techniques described herein.

At 1310, the process 1300 causes the docking head assembly to lower the inventory holder. This may be performed in response to determining a later position of the mobile drive unit based on later sensor data. In some examples, this may be performed after a predetermined amount of time has passed since the sensor data was received. In some examples, the docking head assembly lowers the inventory holder at or about the same time as the docking head assembly tilts the inventory holder. In some examples, lowering the docking head assembly at 1310 may be performed at least while the mobile drive unit is located on the ramp. In some examples, the lifting mechanism of the docking head assembly may be used to lower the inventory holder. This may include instructing the lifting mechanism to lower the inventory holder.

At 1312, the process 1300 receives second sensor data. In some examples, the second sensor data may be received at least while the mobile drive unit is located on the ramp. The second sensor data may be received from a gyro sensor, acceleration sensor, or other suitable sensor. In some examples, the sensor data may indicate an actual angle of the mobile drive unit with respect to some fixed frame of reference, for example, the support surface on a floor of the warehouse.

At 1314, the process 1300 determines an updated tilt angle. In some examples, this may be performed based on the second sensor data. The updated tilt angle may be determined dynamically at least while the mobile drive unit is located on the ramp. The updated tilt angle may be determined, in some examples, when the tilt angle of the inventory holder and the actual angle of the mobile drive unit differ by some threshold, for example, when the second sensor data indicates an angle that is different from the tilt angle.

At 1316, the process 1300 causes the docking head assembly to tilt the inventory holder in accordance with the updated tilt angle. This may include tilting the inventory holder at least while the mobile drive unit is located on the ramp. The tilting may be performed while the mobile drive unit is moving along the ramp or when the mobile drive unit is stopped. In some examples, if the mobile drive unit is unable to tilt the inventory holder in accordance with the updated tilt angle or if the inventory holder remains tilted beyond some safety threshold (e.g., a comparison of the actual tilt angle and a ramp angle), the mobile drive unit may execute a safety protocol. This may include determining a modified tilt angle, tilting the inventory holder, and/or waiting for manual intervention (e.g., a human operator).

FIG. 14 illustrates a flow diagram depicting example acts for implementing techniques relating to assigning transportation tasks to mobile drive units, according to at least one example. The management module 15 (FIG. 3) may perform the process 1400 of FIG. 14.

The process 1400 begins at 1402 by receiving a task for transportation of an inventory holder. The task may be generated in response to any suitable input. For example, the task may indicate that the inventory holder be moved from a first location to a second location. The task may be a subtask which is part of a larger task. For example, the larger task may be a pick task associated with a customer order. For example, an order may be received that identifies an item stowed in the inventory holder, and the task may be one of many subtasks for retrieving the inventory holder and transporting the inventory holder to a station where the item can be picked from the inventory holder before being shipped to the customer.

At 1404, the process 1400 determines whether the task is an inter-floor task. This may include accessing a facility map to determine whether the task would require moving between floors.

If NO at 1404, the process 1400 proceeds to 1406. At 1406, the process 1400 assigns the task to a floor mobile drive unit. The floor mobile drive unit may be configured to move inventory holders along a flat surface (e.g., at one floor in a multi-floor facility). This may include sending the task to the mobile drive unit.

If YES at 1404, the process 1400 proceeds to 1408. At 1408, the process 1400 determines whether a ramp mobile drive unit is available. The ramp mobile drive unit may be configured to move inventory holders between floors (e.g., up inclined ramps).

If NO at 1408, the process 1400 returns and checks again whether the ramp mobile drive unit is available. If YES at 1408, the process 1400 proceeds to 1410. At 1410, the process assigns the task to the ramp mobile drive unit. This may include sending the task to the ramp mobile drive unit.

Figure 15:
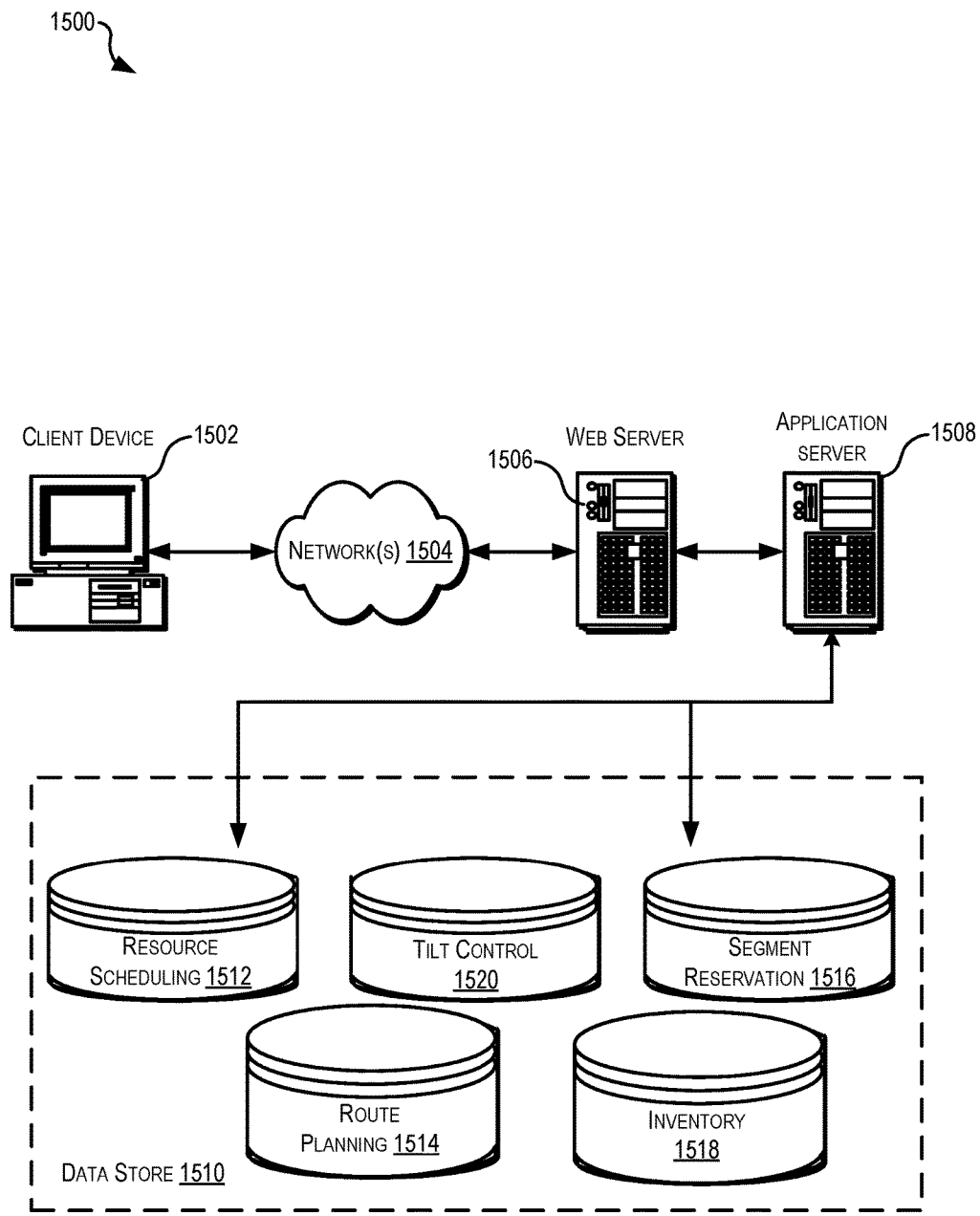
FIG. 15 illustrates an environment in which various features of the inventory system can be implemented, according to at least one example.

FIG. 15 illustrates aspects of an example environment 1000 for implementing aspects in accordance with various examples. As will be appreciated, although a Web-based environment is used for purposes of explanation, different environments may be used, as appropriate, to implement various examples. The environment includes an electronic client device 1502, which can include any appropriate device operable to send and receive requests, messages, or information over an appropriate network 1504 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1506 for receiving requests and serving content in response thereto, although for other networks an alternative device serving a similar purpose could be used as would be apparent to one of ordinary skill in the art.

The illustrative environment includes at least one application server 1508 and a data store 1510. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 1502 and the application server 1508, can be handled by the Web server. It should be understood that the Web and application servers are not required and are merely example components, as structured code discussed herein can be executed on any appropriate device or host machine as discussed elsewhere herein.

The data store 1510 can include several separate data tables, databases or other data storage mechanisms and media for storing data relating to a particular aspect. For example, the data store illustrated includes mechanisms for storing information which can be used by modules described herein, such as resource scheduling information 1512, route planning information 1514, segment reservation information 1516, inventory information 1518, and/or tilt control information 1520. It should be understood that there can be many other aspects that may need to be stored in the data store, such as for page image information and to access right information, which can be stored in any of the above listed mechanisms as appropriate or in additional mechanisms in the data store 1510. The data store 1510 is operable, through logic associated therewith, to receive instructions from the application server 1508 and obtain, update or otherwise process data in response thereto.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one example is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 15. Thus, the depiction of the system 1500 in FIG. 15 should be taken as being illustrative in nature and not limiting to the scope of the disclosure.

The various examples further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most examples utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk®. The network can be, for example, a local area network, a wide-area network, a virtual private network, the Internet, an intranet, an extranet, a public switched telephone network, an infrared network, a wireless network, and/or any combination thereof.

In examples utilizing a Web server, the Web server can run any of a variety of server or mid-tier applications, including Hypertext Transfer Protocol ("HTTP") servers, FTP servers, Common Gateway Interface ("CGP") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of examples, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or Web browser. It should be appreciated that alternate examples may have numerous variations from that described above. For example, customized hardware might also be used and/or particular elements might be implemented in hardware, software (including portable software, such as applets)

or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk ("DVD") or other optical storage, magnetic cassettes, magnetic tape, magnetic disk storage or other magnetic storage devices or any other medium which can be used to store the desired information and which can be accessed by the a system device. Based at least in part on the disclosure and teachings provided herein, a person of ordinary skill in the art will appreciate other ways and/or methods to implement the various examples.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Preferred examples of this disclosure are described herein, including the best mode known to the inventors for carrying out the disclosure. Variations of those preferred examples may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A system, comprising:
    an inventory holder comprising a plurality of compartments configured to hold a plurality of items;
    a mobile drive unit configured for movement within a facility, the mobile drive unit comprising a docking head assembly attached to a frame of the mobile drive unit, the docking head assembly comprising:
        a docking platform;
        a tilting mechanism disposed below the docking platform and comprising a first actuator configured to cause tilting of the docking platform with respect to a horizontal axis of the mobile drive unit; and
        a lifting mechanism disposed below the tilting mechanism, the lifting mechanism comprising:
            a lower frame connected to the mobile drive unit;
            an upper frame pivotably connected to the tilting mechanism; and
            a second actuator configured to cause vertical lifting of the docking platform with respect the horizontal axis of the mobile drive unit; and
    a management device in communication with the mobile drive unit and configured to:
        cause the lifting mechanism to lift the inventory holder into a first orientation by raising the docking platform into engagement with the inventory holder and further raising the inventory holder until the inventory holder is lifted;
        access ramp information identifying properties of an inclined ramp extending between a first floor of the facility and a second floor of the facility;
        determine a tilt angle for tilting the docking platform based at least in part on the ramp information; and
        after the lifting mechanism has lifted the inventory holder into the first orientation, cause the tilting mechanism to tilt the docking platform in accordance with the tilt angle to cause the inventory holder to tilt into a second orientation so that the mobile drive unit is positioned to transport the inventory holder along the inclined ramp.

2. The system of claim 1, wherein the management device is further configured to cause the mobile drive unit to transport the inventory holder along the inclined ramp when the inventory holder is in the second orientation.

3. The system of claim 2, wherein the management device is further configured to:
    cause the mobile drive unit to transport the inventory holder along the inclined ramp from a first location on the first floor to a second location on the second floor;

cause the tilting mechanism to return the docking platform to the first orientation;
cause the lifting mechanism to disengage the docking platform from the inventory holder by lowering the docking platform; and
cause the mobile drive unit to move from the second location on the second floor to a third location on the second floor while disengaged from the inventory holder.

4. The system of claim 1, wherein the management device is further configured such that causing the tilting mechanism to tilt the docking platform to cause the inventory holder to tilt into the second orientation further comprises causing the lifting mechanism to lower the docking platform at or about the same time as the tilting mechanism tilts the docking platform into the second orientation, the docking platform remaining in engagement with the inventory holder when in the second orientation.

5. A computer-implemented method, comprising:
determining a tilt angle for a tilting mechanism of a mobile drive unit based at least in part on path data, the path data associated with a path extending between a first surface and a second surface, the second surface being higher than the first surface;
causing a lifting mechanism of the mobile drive unit to lift a holder structure with respect to a horizontal axis of the mobile drive unit, the lifting mechanism comprising a lower frame connected to the mobile drive unit and an upper frame pivotably connected to the tilting mechanism;
causing the tilting mechanism to tilt the holder structure in accordance with the tilt angle and with respect to the horizontal axis; and
causing the mobile drive unit to transport the holder structure on the path, with the holder structure tilted in accordance with the tilt angle.

6. The computer-implemented method of claim 5, further comprising receiving sensor data from a sensor of the mobile drive unit, the sensor data descriptive of a sensed angle of the mobile drive unit with respect to a reference surface.

7. The computer-implemented method of claim 6, wherein:
the path data is stored in association with a facility map that includes the path; and
the method further comprises updating the path data based at least in part on the sensor data.

8. The computer-implemented method of claim 6, wherein:
the sensor is a gyro sensor; and
the method further comprises:
determining an updated tilt angle based at least in part on the sensor data; and
causing the tilting mechanism to tilt the holder structure in accordance with the updated tilt angle at least while the mobile drive unit is located on the path.

9. The computer-implemented method of claim 5, further comprising, after a leading portion of the mobile drive unit is on the path, causing the lifting mechanism to lower the holder structure at or about the same time as the tilting mechanism tilts the holder structure in accordance with the tilt angle.

10. The computer-implemented method of claim 9, further comprising, prior to causing the lifting mechanism to lower the holder structure:
receiving sensor data representative of a position of the mobile drive unit with respect to the path; and
determining that the leading portion of the mobile drive unit is on the path is based at least in part on the sensor data.

11. The computer-implemented method of claim 5, wherein the tilt angle is equal to a path angle measured between a horizontal plane of the first surface and a non-horizontal plane of the path.

12. The computer-implemented method of claim 5, wherein the tilting mechanism is configured to tilt the holder structure at an angular velocity that corresponds to a velocity of the mobile drive unit.

13. The computer-implemented method of claim 5, wherein:
the mobile drive unit is a ramp mobile drive unit; and
the method further comprises causing a floor mobile drive unit to transport the holder structure to a first position on the first surface proximate to the path prior to causing the lifting mechanism of the mobile drive unit to lift the holder structure.

14. A mobile drive unit, comprising:
a frame;
a drive unit attached to the frame and configured to move the mobile drive unit; and
a docking head assembly attached to the frame, the docking head assembly comprising:
a docking platform configured to engage with a holder structure;
a tilting mechanism disposed below the docking platform and comprising a first actuator coupled to the docking platform and configured to cause tilting of the docking platform with respect to a horizontal axis of the mobile drive unit; and
a lifting mechanism disposed below the tilting mechanism, the lifting mechanism comprising:
a lower frame connected to the mobile drive unit;
an upper frame pivotably connected to the tilting mechanism; and
a second actuator configured to cause vertical lifting of the docking platform with respect the horizontal axis of the mobile drive unit.

15. The mobile drive unit of claim 14, further comprising a management device configured to:
determine a tilt angle for the tilting mechanism based at least in part on path data, the path data associated with a path extending between a first floor and a second floor of a facility;
cause the lifting mechanism to lift the holder structure with respect to the horizontal axis after the mobile drive unit is disposed below the holder structure;
cause the tilting mechanism to tilt the holder structure in accordance with the tilt angle and with respect to the horizontal axis; and
cause the mobile drive unit to transport the holder structure on the path, with the holder structure tilted in accordance with the tilt angle.

16. The mobile drive unit of claim 14, wherein:
the lifting mechanism further comprises:
a first scissor link coupled to each of the upper frame and the lower frame;
a second scissor link coupled to each of the upper frame and the lower frame; and
a connecting member extending between a first middle joint of the first scissor link and a second middle joint of the second scissor link; and
the second actuator is coupled to the lifting mechanism via the connecting member.

17. The mobile drive unit of claim 14, wherein:
the lifting mechanism is configured to couple and decouple with the holder structure by vertically moving the docking platform between:
  a first vertical position in which the docking platform is disposed below the holder structure without physically contacting the holder structure, the holder structure resting on a support surface when the docking platform is in the first vertical position; and
  a second vertical position in which the docking platform physically contacts the holder structure and supports the holder structure, the holder structure held above the support surface when the docking platform is in the second vertical position; and
the tilting mechanism is configured to tilt the docking platform between:
  a level orientation in which the docking platform is level with respect to the horizontal axis, the holder structure held in the level orientation when the docking platform is in the second vertical position and the level orientation; and
  a tilted orientation in which the docking platform is tilted with respect to the horizontal axis, the holder structure held in the tilted orientation when the docking platform is in the second vertical position and the tilted orientation.

18. The mobile drive unit of claim 14, wherein the mobile drive unit is configured to detachably couple with the holder structure and transport the holder structure between floors of a facility.

19. The mobile drive unit of claim 14, wherein the upper frame is pivotably connected to the tilting mechanism at a pivot point, and wherein the tilting mechanism is configured to tilt the holder structure about the pivot point.

20. The mobile drive unit of claim 14, wherein the tilting mechanism is configured to tilt the holder structure independent of the lifting mechanism lifting the holder structure.

21. A computer-implemented method, comprising:
determining a tilt angle for a tilting mechanism of a mobile drive unit based at least in part on path data, the path data associated with a path extending between a first surface and a second surface, the second surface being higher than the first surface;
causing a lifting mechanism of the mobile drive unit to lift a holder structure with respect to a horizontal axis of the mobile drive unit;
causing the tilting mechanism to tilt the holder structure in accordance with the tilt angle and with respect to the horizontal axis, wherein the tilting mechanism is configured to tilt the holder structure at an angular velocity that corresponds to a velocity of the mobile drive unit; and
causing the mobile drive unit to transport the holder structure on the path, with the holder structure tilted in accordance with the tilt angle.

* * * * *

UNITED STATES PATENT AND TRADEMARK OFFICE
CERTIFICATE OF CORRECTION

| | | |
|---|---|---|
| PATENT NO. | : 10,289,117 B1 | Page 1 of 1 |
| APPLICATION NO. | : 15/438363 | |
| DATED | : May 14, 2019 | |
| INVENTOR(S) | : Le Zou and Yuhao Qian | |

It is certified that error appears in the above-identified patent and that said Letters Patent is hereby corrected as shown below:

In the Claims

Column 30, Line 37, Claim 1:
Delete: "of the docking platform with respect the horizontal"
Insert: --of the docking platform with respect to the horizontal--

Column 32, Line 39, Claim 14:
Delete: "of the docking platform with respect the horizontal"
Insert: --of the docking platform with respect to the horizontal--

Signed and Sealed this
Twentieth Day of August, 2019

Andrei Iancu
*Director of the United States Patent and Trademark Office*